United States Patent
Arakawa

(10) Patent No.: US 9,910,674 B2
(45) Date of Patent: Mar. 6, 2018

(54) DATA PROCESSOR WITH EXTENDED INSTRUCTION CODE SPACE INCLUDING A PROHIBITION COMBINATION PATTERN AS A SEPARATE INSTRUCTION

(75) Inventor: Fumio Arakawa, Kanagawa (JP)

(73) Assignee: Renesas Electronics Corporation, Tokyo ( * ) Notice: Subject to any disclaimer, the term of this patent is extended or adjusted under 35 U.S.C. 154(b) by 917 days.

(21) Appl. No.: 14/113,058

(22) PCT Filed: Apr. 10, 2012

(86) PCT No.: PCT/JP2012/059757
§ 371 (c)(1),
(2), (4) Date: Oct. 21, 2013

(87) PCT Pub. No.: WO2012/144374
PCT Pub. Date: Oct. 26, 2012

(65) Prior Publication Data
US 2014/0040600 A1 Feb. 6, 2014

(30) Foreign Application Priority Data

Apr. 21, 2011 (JP) .................................. 2011-094800

(51) Int. Cl.
*G06F 9/30* (2006.01)
*G06F 9/38* (2018.01)

(52) U.S. Cl.
CPC .......... *G06F 9/3836* (2013.01); *G06F 9/3017* (2013.01); *G06F 9/30058* (2013.01);
(Continued)

(58) Field of Classification Search
CPC ...... G06F 9/00–9/3897; G06F 9/30149; G06F 9/30181; G06F 9/30185
(Continued)

(56) References Cited

U.S. PATENT DOCUMENTS 4,439,828 A * 3/1984 Martin .................. G06F 9/3017
712/226
5,922,067 A 7/1999 Nakayama
(Continued)

FOREIGN PATENT DOCUMENTS

JP  2000-284962 A  10/2000
JP  2004-030015 A   1/2004
(Continued)

*Primary Examiner* — Keith Vicary
(74) *Attorney, Agent, or Firm* — Shapiro, Gabor and Rosenberger, PLLC

(57) ABSTRACT

In the data processor in which a combination of multiple specific instructions is prohibited, an instruction set is employed that additionally defines that prohibition combination pattern as a separate instruction. With respect to the prohibition combination pattern additionally defined as the separate instruction, for example, in order to make a definition in such a manner that an instruction dispatch mechanism for the instruction set that is present before the additional definition is used as is, the instruction to be additionally defined by the prohibition combination pattern is limited to an instruction type that is the same as the instruction defined only with a latter-half code of the instruction in a case of an instruction set in which the instruction set that is present before the additional definition includes a prefix code.

8 Claims, 10 Drawing Sheets

| (9)  | A1 | code12 | B1/C1 | code12 |
|------|----|--------|-------|--------|
| (10) | A1 | code12 | B2/C2 | code8  |
| (11) | A2 | code8  | B1/C1 | code12 |
| (12) | A2 | code8  | B2/C2 | code8  |

A1,C1 = {1010, 1011}
A2,C2 = {10001101, 10001111}
B1 = {1001,1101}
B2 = {10001001, 10001011}

(52) U.S. Cl.
 CPC ...... *G06F 9/30145* (2013.01); *G06F 9/30149* (2013.01); *G06F 9/30181* (2013.01); *G06F 9/30185* (2013.01); *G06F 9/382* (2013.01)

(58) Field of Classification Search
 USPC .................................................. 712/23, 226
 See application file for complete search history.

(56) References Cited

U.S. PATENT DOCUMENTS

| | | | |
|---|---|---|---|
| 2004/0039897 A1 | 2/2004 | Kudo | |
| 2010/0064119 A1 | 3/2010 | Arakawa | |
| 2013/0246765 A1* | 9/2013 | Arakawa | ............. G06F 9/30043 712/226 |

FOREIGN PATENT DOCUMENTS

| | | |
|---|---|---|
| JP | 2010-066893 A | 3/2010 |
| JP | 08-95780 A | 2/2012 |

\* cited by examiner

Fig.1

| | | | | | | | | | | | |
|---|---|---|---|---|---|---|---|---|---|---|---|
| (1) | 1 | 0 | 1 | 0 | | | | disp12 | | | BRA disp12 |
| (2) | 1 | 0 | 1 | 1 | | | | disp12 | | | BSR disp12 |
| (3) | 1 | 0 | 0 | 0 | 1 | 1 | 0 | 1 | disp8 | | BT/S disp8 |
| (4) | 1 | 0 | 0 | 0 | 1 | 1 | 1 | 1 | disp8 | | BF/S disp8 |

Fig.2

| | | | | | | | |
|---|---|---|---|---|---|---|---|
| (5) | 1 | 0 | 0 | 1 | Rn | disp8 | MOV.W @(PC, disp8), Rn |
| (6) | 1 | 1 | 0 | 1 | Rn | disp8 | MOV.L @(PC, disp8), Rn |
| (7) | 1 | 0 | 0 | 0 | 1 0 0 1 | disp8 | BT disp8 |
| (8) | 1 | 0 | 0 | 0 | 1 0 1 1 | disp8 | BF disp8 |

Fig.3

| | | | | |
|---|---|---|---|---|
| (9) | A1 | code12 | B1/C1 | code12 |
| (10) | A1 | code12 | B2/C2 | code8 |
| (11) | A2 | code8 | B1/C1 | code12 |
| (12) | A2 | code8 | B2/C2 | code8 |

$$\begin{pmatrix} A1, C1 = \{1010, 1011\} & B1 = \{1001, 1101\} \\ A2, C2 = \{10001101, 10001111\} & B2 = \{10001001, 10001011\} \end{pmatrix}$$

| CODE | TYPE | CODE | TYPE | CODE | TYPE | TYPE-DS | CODE | TYPE | TYPE-DS |
|------|------|------|------|------|------|---------|------|------|---------|
| 0000 | LS | 0100 | LS | 1000 | BRD/BR/PX | PX/BR | 1100 | LS | LS |
| 0001 | LS | 0101 | LS | 1001 | LSX | EX | 1101 | LSX | LS |
| 0010 | EX | 0110 | EX | 1010 | BRD | PX | 1110 | EX | EX |
| 0011 | EX | 0111 | EX | 1011 | BRD | PX | 1111 | EX | EX |

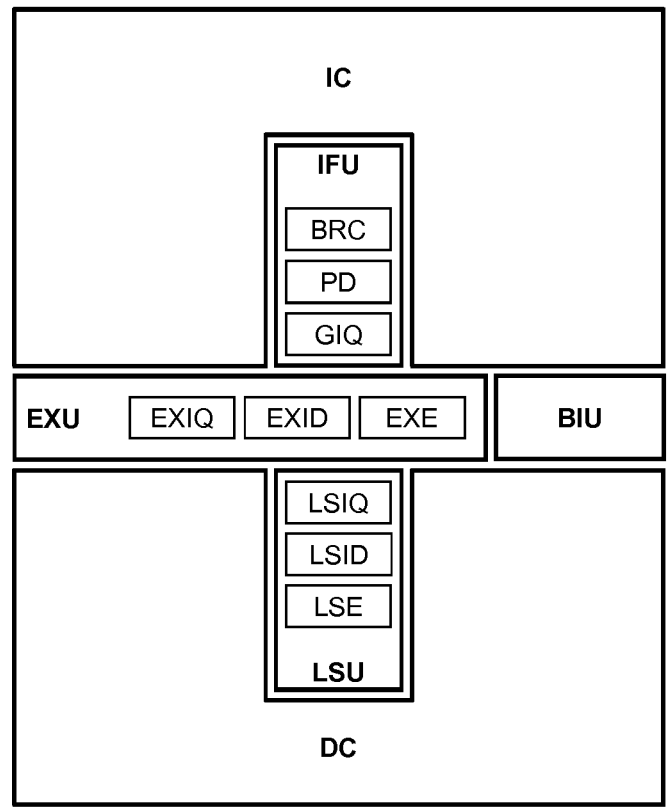

| | | | | | | | | |
|---|---|---|---|---|---|---|---|---|
| (5) | 1 | 0 | 0 | 1 | Rn | disp8 | | MOV.W @(PC, disp8), Rn |
| (6) | 1 | 1 | 0 | 1 | Rn | disp8 | | MOV.L @(PC, disp8), Rn |
| (13) | 0 | 1 | 0 | 1 | Rn | Rm | disp4 | MOV.L @(Rm, disp4), Rn |
| (14) | 1 | 1 | 1 | 0 | Rn | imm8 | | MOV #imm8, Rn |
| (15) | 0 | 1 | 1 | 1 | Rn | imm8 | | ADD #imm8, Rn |

DATA PROCESSOR WITH EXTENDED INSTRUCTION CODE SPACE INCLUDING A PROHIBITION COMBINATION PATTERN AS A SEPARATE INSTRUCTION

TECHNICAL FIELD

The present invention relates to a technology for adding a new instruction code which is multiple times longer than a basic length of an instruction code to an instruction set and, for example, relates to an effective technology that is applicable to a processor having a delay slot instruction, in which an undue exception of a slot is generated among processors each with a 16-bit fixed-length instruction set or a 16/32-bit length-mixed instruction set.

BACKGROUND ART

As a data processor (a built-in processor) incorporated into an apparatus which needs to have high efficiency, a RISC (Reduced Instruction Set Computer) type built-in processor is widespread. The RISC type is a 16-bit fixed-length instruction set by which high code efficiency can be realized. Even at the present time, in which memory capacity has advanced, high code efficiency is indispensable in effectively utilizing on-chip cache, RAM or ROM. However, with the 16-bit fixed-length instruction set, a program size can be decreased, but the number of instructions is increased. Specifically, due to a restriction on operand designation, the number of move instructions between registers and move immediate instructions is increased. The increase in the number of instructions is a cause of a decrease in performance and of an increase in power consumption.

This problem occurs because an instruction code space of the 16-bit fixed-length instruction set, $2^{16}$=64 k patterns, is considerably small, compared to an instruction code space of a 32-bit fixed-length instruction set, $2^{32}$=4 G patterns. Because of this, for example, a data processor is provided in which the instruction code space is broadened by mixing the 16-bit fixed-length instruction and the 32-bit fixed-length instruction. On the other hand, in the processors in PTL 1 and PTL 2, the instruction code space is broadened by a 16-bit prefix to the 16-bit fixed-length instruction set. In PTL 3, a method is disclosed in which superscalar execution is realized in the instruction set including the 16-bit prefix.

CITATION LIST

Patent Literature

[PTL 1] JP-A-2000-284962
[PTL 2] JP-A-2004-030015
[PTL 3] JP-A-2010-66893

DISCLOSURE OF THE INVENTION

Problems that the Invention is to Solve

As is described above, as an instruction code space extension method for compensating for a small size of the instruction code space of the 16-bit fixed-length instruction code, there are a 16/32-bit length-mixed instruction set method and a 16-bit prefix addition method. However, a sufficient empty instruction code space is necessary to add the instruction while maintaining compatibility with the existing 16-bit fixed-length instruction set, but normally there is little room for such an instruction code space.

Two instruction sets, the existing 16-bit fixed-length instruction set and the 32-bit fixed-length instruction set, are properly used by mode switching. In order to integrate these two instruction sets into 16/32-bit length-mixed instruction set, an instruction set, a case in which a front 5-bit is 11101, 11110, or 11111, for example, in an empty pattern of the 16-bit length instruction set is allocated to a 32-bit length instruction. This makes it possible to obtain $3 \times 2^{(32-5)}$=384 M (mega) patterns. However, the existing 32-bit fixed-length instruction set defined in the 32-bit code space cannot be allocated to the space described above while maintaining binary compatibility, and moreover, although binary compatibility may not be maintained, all the instructions cannot be also stored in the space described above.

Furthermore, as the 16/32-bit length-mixed instruction set, in the pattern of the 16-bit code space, compatibility is maintained by allocating four 8-bit operand codes to the 32-bit length instruction. In this mixed-instruction set, two codes of the four codes are allocated to two instructions of a 24-bit operand field by setting an entire 16-bit obtained by the addition due to conversion to 32-bit as an operand field, and the remaining two codes are allocated to thirty-two instructions of a 20-bit operand field by setting 4-bit of 16-bit obtained by the addition as a code field and setting 12-bit as an operand field. As a result, the code space that can be extended is $(2 \times 2^{24})+(32 \times 2^{20})=2^{26}$=64 M patterns. However, the scale of instruction extension becomes small.

When the pattern that can be allocated to a prefix code is limited in the same matter also in a case where the prefixes disclosed in PTL 1 and PTL 2 are used, it is difficult to increase the scale of instruction extension as described above.

Furthermore, if issuance of high-speed instruction cannot be guaranteed also with respect to the instructions defined in the extended instruction code space, conversely, this causes a decrease in performance. The importance that, with respect to instruction execution by superscalar, an instruction code type be determined in parallel at a high speed and thus an instruction be enabled to be efficiently issued to each instruction pipeline was discovered by the inventor.

In this respect, in the 16/32-bit length-mixed instruction set method, when the latter-half 16-bit of the 32-bit length instruction is called an extension portion, the interpretation of the code changes depending on whether or not the instruction code is the extension portion. Then, because whether or not the instruction code is the extension portion is dependent on the preceding instruction code, a sequential decoder is necessary, and in this situation, it is difficult to determine the instruction code type at a high speed and in parallel.

On the other hand, in the extension method of using the prefix code, parallel decoding in a 16-bit code unit is possible, and the instruction code type can be determined at a high speed and in parallel. For example, as a prefix method, an efficient superscalar instruction issuing method is disclosed in PTL 3. However, in the prefix method represented by PTL 3 and others, if the number of the prefix codes that can be allocated is small in itself, further improvement cannot be obtained.

Solution to Problem

An object of the present invention is to provide a data processor which maintains compatibility with an existing instruction set such as a 16-bit fixed-length instruction set and in which an instruction code space is extended.

Another object of the present invention is to provide a data processor that is capable of efficiently supplying an instruction to multiple instruction pipelines also with respect to the instruction defined in an extended instruction code space.

The objects described above and other objects and novel distinctive features according to the present invention are apparent from descriptions in the present specification and accompanying drawings.

Means for Solving the Problems

A representative aspect of the invention that is disclosed in the present application is described in a brief and outlined manner as follows.

That is, in a data processor in which a combination of multiple specific instructions is prohibited, an instruction set is employed that additionally defines a pattern of that prohibition combination as a separate instruction.

A definition is made with respect to the instruction in the above-described prohibition combination pattern additionally defined as the separate instruction, for example, in such a manner that an instruction dispatch mechanism for an instruction set that is present before the additional definition is used as is. For example, in a case of an instruction set in which the instruction set that is present before the additional definition includes a prefix code, the instruction additionally defined by the above-described prohibition combination pattern is limited to an instruction type that is the same as the instruction only with a latter-half code of the instruction.

Furthermore, when the instruction set that is present before the additional definition is an instruction set that includes a prefix code, the above-described prohibition combination pattern is set as being dedicated to the branch instruction, and the branch instruction is used as a latter-half pattern thereof.

Furthermore, when the instruction set that is present before the additional definition is the instruction set that includes the prefix code, only the pattern that is not used in the latter half is used on the latter half of the above-described prohibition combination pattern, and instruction code type information is exchanged between the adjacent codes. Thus, the instruction type of the above-described prohibition combination pattern is determined.

Furthermore, in a case where the instruction set that is present before the additional definition is a mixed instruction code in which code of a basic length and code two times the basic length are mixed, the above-described prohibition combination pattern is processed as a two times-length instruction code.

On the other hand, the data processor can have a configuration in which a combination of two instructions that is not prohibited but does not have a meaning is prohibited, and thus the instruction set that additionally defines the prohibition combination pattern as a separate instruction is employed.

Effects of the Invention

The effects obtained by a representative aspect of the invention that is disclosed in the present application is briefly described as follows.

That is, a data processor can be realized in which an instruction code space is extended while maintaining compatibility with an existing instruction set, such as a 16-bit fixed-length instruction set. Furthermore, instruction supplying can be efficiently performed on multiple instruction pipelines also with respect to the instruction defined in an extended instruction code space.

BRIEF DESCRIPTION OF THE DRAWINGS

FIG. 1 is an explanatory view illustrating a "branch instruction with a delay slot" that constitutes a "slot undue-exception pattern."

FIG. 2 is an explanatory view further illustrating an instruction that is used as an "instruction that cannot be placed in the delay slot" in addition to the instructions in FIG. 1.

FIG. 3 is an explanatory view illustrating the "slot undue-exception patterns" resulting from combinations of instructions in FIG. 1 and FIG. 2, which are classified according to the number of bits of an operand field.

FIG. 6 is a block diagram illustrating a configuration of a processor core.

FIG. 7 is an explanatory view illustrating a configuration of a pipeline of the processor core.

DESCRIPTION OF EMBODIMENTS

1. Summary of the Embodiments

Figures 4, 5:
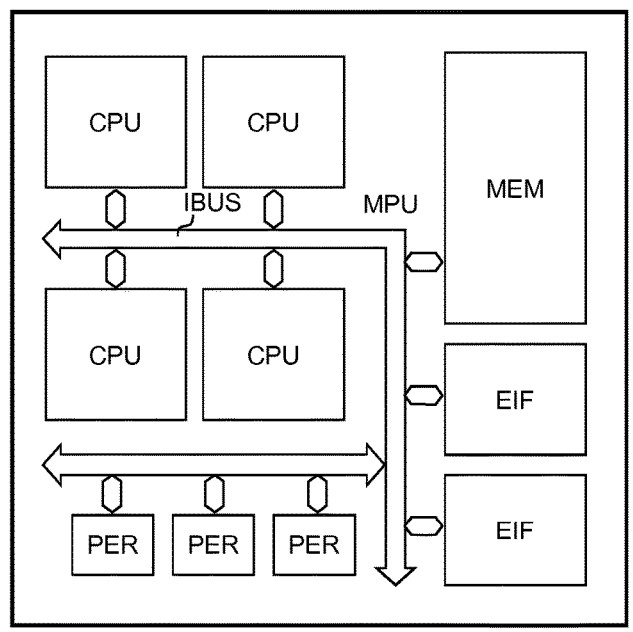
FIG. 4 is an explanatory view illustrating classified allocation of high-order 4-bit CODE of an instruction code with respect to an instruction type TYPE.
FIG. 5 is a block diagram illustrating a data processor according to the present embodiment.

First, a summary of representative embodiments of the present invention disclosed in the present patent application is provided. A reference numeral put in parenthesis in the drawings, which is referred to in the summarized description of the representative embodiments, exemplifies only what is included in a concept of a constituent element to which the reference numeral is given.

[1] <Additional Definition of a Prohibition Combination Pattern of Multiple Specific Instruction Codes as a Separate Instruction>

A data processor (MPU) according to a representative embodiment of the present invention has multiple instruction pipelines (EXPL, LSPL, and BRPL), a global instruction queue (GIQ) that sequentially accumulates multiple instruction codes that are fetched in parallel, and dispatch circuits (EX-ISD, LS-ISD, and BR-ISD), each of which conducts a search with respect to the multiple instruction codes that are output from the global instruction queue, for every instruction code type, and distributes the instruction code to every pipeline based on a result of the search. The data processor has an instruction set that additionally defines as a separate instruction a prohibition combination pattern resulting from a combination of multiple specific instruction codes, by which original processing of the individual instruction code is prohibited.

A delay slot included in a 16-bit fixed-length instruction set is a slot into which an instruction that follows a branch instruction is input and an instruction present in such a slot (a delay slot instruction) is executed before a branch destination instruction. Normally, such a slot is one instruction equivalent. Furthermore, when an exception or an interruption occurs between the branch instruction and the delay slot instruction, because processing resumes beginning with the delay slot instruction and the branch instruction is not processed accurately, a way of inseparably executing both is common. Moreover, because the branch instruction changes a PC (a program counter), it is general that the delay slot instruction prohibits an instruction that refers to or changes PC. As a result, a pair of one branch instruction and one delay slot instruction is handled as a 32-bit length instruction, and the prohibited combination pattern is handled as an undue exception of the slot and is not utilized. According to this embodiment, a prohibition pattern is utilized such as "a 32-bit pattern resulting from a pair of one branch instruction with the delay slot and one instruction not placed in the delay slot," and thus a new instruction is defined as being added to an instruction set. By doing this, compatibility with the existing instruction set such as the 16-bit fixed-length instruction set is maintained, and thus the data processor in which an instruction code space is extended can be realized.

At this point, in the present specification, the prohibition combination pattern can be comprehended as having significance as follows. That is, the prohibition combination pattern means a combination pattern of a first instruction code and a second instruction code that causes a concern that a combination of the first instruction code that processes first processing and the second instruction code that processes second processing might make, for example, an error or a malfunction occur in the first processing and/or the second processing. Therefore, determination of whether or not the combination pattern is the prohibition combination pattern does not require an explicit statement of the combination prohibition with respect to the combination of the instruction sets. For example, if the combination pattern is one that causes the concern that the error or the malfunction occur might actually occur, the determination may be possible.

[2] <Instruction Code Type in the Additional Definition Consistent with the Instruction Code Type that Follows the Prohibition Combination Pattern (First Embodiment)>

The data processor as described above in [1], wherein the instruction additionally defined by the prohibition combination pattern of the above-described multiple specific instruction codes is limited to the instruction type that is the same as the instruction code defined only with the latter-half instruction code type of the combination pattern.

By doing this, the former half of the prohibition combination pattern can be handled as a prefix of the latter half.

[3] <Prohibition Combination Pattern Resulting from the Instruction Code of which the Former Half and the Latter Half are Different from Each Other>

The data processor as described above in [2], wherein in the prohibition combination pattern of the above-described multiple specific instruction codes, the instruction code pattern of which the former half and the latter half are different from each other is a different instruction code.

Because in a "slot undue-exception pattern" as the above-described prohibition combination pattern, the branch instruction with the delay slot is also an instruction that cannot be placed in the delay slot, the branch instruction with the delay slot can be present in the former half of the pattern, or present in the latter half of the pattern. In such a case, because when the branch instructions with the delay slot are successive one after another, the odd-numbered branch instruction is the former half, and the even-numbered branch instruction is the latter half, a sequential decoding is necessary for distinction between them, and there is a concern that processing for assignment of the instruction to the multiple instruction pipelines decreases in efficiency. According to the above-described means, the branch instruction with the delay slot is excluded from the instruction that cannot be placed in the delay slot, and this can contribute to the efficiency of the processing for assignment of the instruction to the multiple instruction pipelines.

[4] <Distribution of a Prefix Candidate by the Dispatch Circuit>

The data processor as described above in [3], wherein when the intended instruction code of the instruction code type is detected in a search unit of the multiple instruction codes, a search target, the above-described dispatch circuit outputs the detected instruction code as being valid and outputs the instruction code that immediately precedes the detected instruction code as a prefix code candidate. And when the intended instruction code of the instruction code type is detected in the front of the above-described search unit, the above-described dispatch circuit outputs the front instruction code as being valid. And when the intended instruction code of the instruction code type cannot be detected even in the rear of the search unit, the above-described dispatch circuit outputs the rear instruction code as the prefix code candidate.

Accordingly, if the instruction that is input falls within a search scope, the dispatch circuit issues the instruction to the corresponding instruction pipeline and regards the code that immediately precedes the instruction, as the prefix. Thus, the dispatch circuit adds the code to the instruction and dispatches the code added to the instruction to the instruction pipeline in question (an execution pipeline). And the decoder of each execution pipeline checks whether or not the code that is added to the instruction is the prefix and if the code is the prefix, performs instruction decoding using also that prefix, and thus can superscalar-issue the instruction with the prefix as well. For example, even though the branch instruction with the delay slot is present, the delay slot instruction may be dispatched to the instruction pipeline for the instruction, and the branch instruction with the delay slot may be dispatched to the instruction pipeline. By doing this, the supplying of the instruction to the multiple instruction pipelines is efficiently performed with respect to the instruction defined in the extended instruction code space.

[5] <Handling of the Prefix Code Candidate by the Instruction Pipeline>

The data processor as described above in [4], wherein when the instruction code supplied as the prefix code candidate constitutes the combination of the above-described multiple specific instruction codes, the above-described instruction pipeline processes the combination of the multiple specific instruction codes as an additionally-defined instruction. And when the instruction code supplied as the prefix code candidate does not constitute the combination of the multiple specific instruction codes, the above-described instruction pipeline disregards the instruction code.

Accordingly, the instruction pipeline can perform execution processing with respect to a new instruction in the prohibition combination pattern without performing specially-complex processing in case that decoding the dispatched instruction code.

[6] <Handling of the Prefix Code Candidate in the Preceding Search with Respect to the Instruction Code in the Following Search>

The data processor as described above in [5], wherein the above-described instruction pipeline uses the above-described rear instruction code that is supplied as the prefix code candidate, as the prefix code candidate for constituting the combination of the above-described multiple specific instruction codes with respect to the instruction code that is detected in the front in the instruction code search that immediately follows the supplying of the instruction codes and thus is supplied.

Individually-supplied prefix code can be easily handled.

[7] <Instruction Code Type in the Additional Definition and the Instruction Code in the Prohibition Combination Pattern are all the Branch Instruction (Second Embodiment) the data processor as described above in [2], wherein the instruction additionally defined by the prohibition combination pattern of the above-described multiple specific instruction codes is dedicated to the branch instruction, and the instruction code of the branch instruction is used in the latter-half instruction code pattern of the prohibition combination pattern.

Firstly, in the data processor in Clause 2, there is a case where the instruction code cannot be executed because in a case of the "slot undue-exception pattern", the latter half of the pattern does not follow when the branch instruction with the delay slot in the former half of the pattern is dispatched, as the branch instruction, to the branch pipeline, and there occurs useless dispatching. Secondly, because the latter half of the pattern is regarded as the instruction and is dispatched and because the former half of the pattern is added as the prefix candidate therefor, there is imposed a limitation that the latter half of the pattern and the "slot undue-exception pattern" should be instruction codes executed in the same execution pipeline. The technological means in Clause 7 contributes to solving such a problem.

[8] <Branch Instruction with the Delay Slot and Other Branch Instructions that cannot be Placed in the Delay Slot>

The data processor as described above in [7], wherein in the prohibition combination pattern of the above-described multiple specific instruction codes, separately defined by the above-described combination, the former-half instruction code pattern is the branch instruction with the delay slot, and the latter-half instruction code pattern is the branch instruction other than the branch instruction with the delay slot that cannot be placed in the delay slot.

The use of the branch instruction with the delay slot and the branch instruction arranged in the delay slot thereof can easily limit a type of pattern with respect to the above-described prohibition combination pattern.

[9] <Distribution of a Postfix Candidate by the Dispatch Circuit>

The data processor as described above in [7], wherein when the intended instruction code of the instruction code type is detected in other than the last portion in the search unit of the multiple instruction codes, the search target, the above-described dispatch circuit outputs the detected instruction code as being valid and outputs the instruction code that immediately follows the detected instruction code, as a postfix code candidate. And when the intended instruction code of the instruction code type is detected in the last portion in the search unit of the multiple instruction codes, the above-described dispatch circuit outputs the last instruction code as being valid.

In Clause [7], the "slot undue-exception pattern" is dedicated to the branch instruction, the branch instruction is used as the latter-half pattern thereof, and the prefix is not used in the branch instruction. However, at this point, additionally in Clause [8], in case that dispatching the branch instruction, the code that immediately follows the instruction, not the code that immediately precedes the instruction is added, and when the instruction is the "slot undue-exception pattern," the decoder of the branch pipeline uses the added code as well. Thus, proper decoding of the "slot undue-exception pattern" is made possible, and the above-described first problem described in Clause [7] can be avoided. At this time, because the latter-half pattern of the "slot undue-exception pattern" is the branch instruction, the second problem does not occur.

[10] <Handling of the Postfix Code Candidate by the Instruction Pipeline>

The data processor as described above in [9], wherein when the instruction code supplied as the postfix code candidate constitutes the combination of the above-described multiple specific instruction codes, the above-described instruction pipeline processes the combination of the above-described multiple specific instruction codes as the additionally-defined instruction. And when the instruction code supplied as the postfix code candidate does not constitute the combination of the above-described multiple specific instruction codes, the above-described instruction pipeline disregards the instruction code.

Accordingly, the instruction pipeline can perform the execution processing with respect to a new instruction in the prohibition combination pattern without performing specially-complex processing in case that decoding the dispatched instruction code.

[11] <Handling of the Postfix Code Candidate in the Preceding Search with respect to the Instruction Code in the Following Search>

The data processor as described above in [10], wherein with respect to the above-described last instruction code supplied from the above-described dispatch circuit, the above-described instruction pipeline uses the instruction code, which is detected in the front in the instruction code search that immediately follows the supplying and thus is supplied, as the postfix code candidate for constituting the combination of the above-described multiple specific instruction codes.

The individually-supplied instruction code and the prefix code supplied from the search that immediately follows the supplying can be easily handled.

[12] <Pre-determination of the Instruction Type of the Prohibition Combination Pattern Through an Exchange of Information on the Instruction Code Type Between the Codes Adjacent to the Prohibition Combination Pattern (Third Embodiment)>

The data processor as described above in [1], wherein in the prohibition combination pattern of the above-described multiple specific instruction codes, the instruction code pattern that is different from the former-half instruction code pattern is used in the latter-half instruction code pattern, and the above-described dispatch circuit has a pre-decoder in the front thereof. The above-described pre-decoder discerns the instruction code type of the instruction code and exchanges information on the instruction code type between the adjacent instruction codes and thus supplies information for determining whether the instruction code is an instruction type that constitutes the above-described prohibition combination pattern, to the above-described dispatch circuit. The above-described dispatch circuit decides the instruction pipeline that supplies the instruction by the above-described prohibition combination pattern by using the information for the determination (even in a case where the instruction type of the instruction separately defined by the above-described prohibition combination pattern is different from the instruction type by the latter-half instruction code pattern of the prohibition combination pattern).

In order to utilize the prohibition combination pattern as an arbitrary instruction-type instruction without the prohibition combination pattern being dedicated to the branch instruction, an instruction code determination mechanism for doing so is necessary. The instruction-type prohibition combination pattern cannot be arbitrarily detected only by determining the instruction code with the basic length unit of the instruction code such as a 16-bit unit, but the prohibition combination pattern can be detected by exchanging the information on a result of determining the instruction code in the basic length unit of the instruction code between the adjacent codes. Then, the instruction type or a processing function by the instruction can be freely allocated with respect to the prohibition combination pattern, by handling the former half of the pattern in the same manner as the prefix and handling the latter half of the pattern in the same manner as any one of the branch instruction, a load store instruction, and an arithmetic operation instruction.

[13] <Prohibition Combination Pattern is Set as the Two-Times-Length Instruction Code in a Case where a Mixed Instruction Code with a Basic Length and Two Times the Basic Length is Included in the Instruction Set (Fourth Embodiment)

The data processor as described above in [1], wherein the instruction code included in the above-described instruction set is a mixed instruction code in which the instruction code with a basic length and the instruction code with two times the basic length are mixed. The above-described dispatch circuit supplies the instruction code with the basic length to the instruction pipeline that corresponds with the basic length and supplies the instruction code with two times the basic length to the instruction pipeline that corresponds with the length two times the basic length. At this time, the instruction code of the above-described prohibition combination pattern is defined as a two-times-length instruction code.

In a case of maintaining the instruction set in a system of the mixed instruction code with a basic length and two times the basic length, the prohibition combination pattern is handled as a 32-bit instruction, and thus the extension of the instruction by the use of prohibition combination pattern can be easily performed by effectively performing a function such as a pre-decoding function that sequentially decodes the mixed instruction code. In this case, with respect to all the prohibition combination patterns, the best plan is to utilize whatever instruction patterns can be allocated.

[14] <Additional Definition of the Combination Pattern of the Multiple Instructions, not Prohibited, but Meaningless, as a Separate Instruction (Fifth Embodiment)>

A data processor (MPU) according to another embodiment of the present invention has multiple instruction pipelines (EXPL, LSPL, and BRPL), a global instruction queue (GIQ) that sequentially accumulates multiple instruction codes that are fetched in parallel, and dispatch circuits (EX-ISD, LS-ISD, and BR-ISD) each of which conducts a search with respect to the multiple instruction codes that are output from the global instruction queue, for every instruction code type, and distributes the instruction code to every instruction pipeline based on a result of the search. The data processor has an instruction set that additionally defines as a separate instruction the prohibition combination pattern resulting from a combination of the multiple instructions codes, by which an original combination is not prohibited, but which has no a meaning.

In addition to the pattern that produces an exception like the above-described combination pattern, a concept of the present invention can be applied also to a combination of the multiple instructions that has no a meaning in terms of a program. For example, if in a case of successive loads to the same register, a register of a load destination of the first load is not a source operand of the second load, it is not necessary to execute the first load. Such successive loads to the same register are not prohibited, but when the present invention that prohibits such a combination of two instructions is applied, the code space can be extended.

[15] <Additional Definition of the Prohibition Combination Pattern of the Multiple Specific Instruction Codes as a Separate Instruction>

A data processor (MPU) according to another embodiment of the present invention has multiple instruction pipelines (EXPL, LSPL, and BRPL), a global instruction queue (GIQ) that sequentially accumulates multiple instruction codes that are fetched in parallel, and dispatch circuits (EX-ISD, LS-ISD, and BR-ISD) each of which conducts a search with respect to the multiple instruction codes that are output from the global instruction queue, for every instruction code type, and distributes the instruction code to every instruction pipeline based on a result of the search. The above-described instruction pipeline furthermore performs processing with respect to the combination of the multiple specific instruction codes, as a single separate instruction code, by which the original processing of the individual instruction code is prohibited. The above-described dispatch circuit searches for the combination of the combination of the above-described multiple specific instruction codes and thus supplies a result of the search to the corresponding instruction pipeline.

The operation is the same as that in Clause [1].

[16] <Instruction Code Type in the Additional Definition is Consistent with the Instruction Code Type that Follows the Prohibition Combination Pattern (First Embodiment)>

The data processor as described above in [15], wherein the instruction additionally defined by the prohibition combination pattern of the above-described multiple specific instruction codes is limited to the instruction type that is the same as the instruction code defined only with the latter-half instruction code pattern of the combination pattern.

The operation is the same as that in Clause [2].

[17] <Prohibition Combination Pattern Resulting from the Instruction Code of which the Former Half and the Latter Half are Different from Each Other>

The data processor as described above in [16], wherein in the prohibition combination pattern of the above-described multiple specific instruction codes, the instruction code pattern of which the former half and the latter half are different from each other is a different instruction code.

The operation is the same as that in Clause [3].

[18] <Instruction Code Type in the Additional Definition and the Instruction Code in the Prohibition Combination Pattern are all the Branch Instruction (Second Embodiment)>

The data processor as described above in [16], wherein the instruction additionally defined by the prohibition combination pattern of the above-described multiple specific instruction codes is dedicated to the branch instruction, and the instruction code of the branch instruction is used in the latter-half instruction code pattern of the prohibition combination pattern.

The operation is the same as that in Clause [7].

[19] <Branch Instruction with the Delay Slot and Other Branch Instructions that cannot be Placed in the Delay Slot>

The data processor as described above in [18], wherein in the prohibition combination pattern of the above-described multiple specific instruction codes, separately defined by the above-described combination, the former-half instruction code pattern is the branch instruction with the delay slot, and the latter-half instruction code pattern is the branch instruction other than the branch instruction with the delay slot that cannot be placed in the delay slot.

The operation is the same as that in Clause [8].

[20] <Determination of the Instruction Type of the Prohibition Combination Pattern through the Exchange of the Information on the Instruction Code Type between the Codes Adjacent to the Prohibition Combination Pattern (Third Embodiment)>

The data processor as described above in [15], wherein in the prohibition combination pattern of the above-described multiple specific instruction codes separately defined by the above-described combination, the instruction code pattern that is different from the former-half instruction code pattern is used in the latter-half instruction code pattern. The above-described dispatch circuit has the pre-decoder in the front thereof. The above-described pre-decoder discerns the instruction code type of the instruction code and exchanges the information on the instruction code type between the adjacent instruction codes and thus supplies the information for determining whether the instruction code is an instruction type that constitutes the above-described prohibition combination pattern to the above-described dispatch circuit. The above-described dispatch circuit decides the instruction pipeline that supplies the instruction by the above-described prohibition combination pattern by using information for the determination (even in a case where the instruction type of the instruction separately defined by the above-described prohibition combination pattern is different from the instruction type by the latter-half instruction code pattern of the prohibition combination pattern).

The operation is the same as that in Clause [12].

[21] <Prohibition Combination Pattern is Set as the Two-Times-Length Instruction Code in a Case where the Mixed Instruction Code with a Basic Length and Two Times the Basic Length is Included in the Instruction Set (Fourth Embodiment)>

The data processor as described above in [15], wherein the instruction code included in the above-described instruction set is a mixed instruction code in which the instruction code with a basic length and the instruction code with two times the basic length are mixed. The above-described dispatch circuit supplies the instruction code with the basic length to the instruction pipeline that corresponds with the basic length unit, and supplies the instruction code with two times the basic length to the instruction pipeline that corresponds with the length two times the basic length unit. The instruction code of the above-described prohibition combination pattern is defined as a two-times-length instruction code.

The operation is the same as that in Clause [13].

[22] <Combination of the Multiple Instructions, not Prohibited, but Meaningless, is Additionally Defined as a Separate Instruction (Fifth Embodiment)>

A data processor (MPU) according to another embodiment of the present invention has multiple instruction pipelines (EXPL, LSPL, and BRPL), a global instruction queue (GIQ) that sequentially accumulates multiple instruction codes that are fetched in parallel, and dispatch circuits (EX-ISD, LS-ISD, and BR-ISD) each of which conducts a search with respect to the multiple instruction codes that are output from the global instruction queue, for every instruction code type, and distributes the instruction code to every instruction pipeline based on a result of the search. The above-described instruction pipeline furthermore performs processing with respect to the combination of the multiple specific instruction codes, as a single separate instruction code, by which the original combination is not prohibited, but which has no a meaning, and the above-described dispatch circuit searches for the combination of the above-described multiple specific instruction codes and supplies a result of the search to the corresponding instruction pipeline.

The operation is the same as that in Clause [14].

2. Further Detailed Description of the Embodiments

The embodiments are furthermore described.

(First Embodiment) An example is considered that includes the four instructions in FIG. 1 as the "branch instruction with the delay slot" that constitutes the "slot undue-exception pattern," and the eight instructions in FIG. 1 and FIG. 2 as the "instruction that cannot be placed in the delay slot." An instruction (1) in FIG. 1 is an unconditional branch instruction for the program counter (hereinafter referred to as the PC) with the delay slot, an instruction (2) is a subroutine call instruction for the PC with the delay slot, and instructions (3) and (4) are conditional branch instructions for the PC with the delay slot. Each of the instructions (1) to (4) branches in a case where a condition flag is set or is not set. Furthermore, instructions (5) and (6) in FIG. 2 are load instructions for the PC, and each loads 16-bit data and 32-bit data. Then, instructions (7) and (8) are branch instructions for the PC, and the instructions (7) and (8) branch in a case where the condition flags are set or are not set, respectively. An operand field of each of the instructions (1), (2), (5), and (6) is 12-bit, and an operand field of the instructions (3), (4), (7), and (8) is 8-bit. In FIG. 1 and FIG. 2, "disp8" means 8-bit displacement, "disp12", means 12-bit displacement, PC means a program counter value, and Rn means a general-purpose register number n.

The "slot undue-exception patterns" resulting from the combination of the instructions are classified into four patterns according to the number of bits of the operand field, as illustrated in FIG. 3. Then, the operand field of the instruction to be combined is set as the code or the operand field of the instruction to be newly defined. Accordingly, a 12-bit field is called a code12, and an 8-bit field is called a code8.

The code12 is present in both of the former half and the latter half of the pattern (9). 1010 or 1011 that is a code of the instruction (1) or (2) is input into a code A1 of the former half of the pattern, 1001 or 1101 that is a code of the instruction (5) or (6) is input into a code B1 of the latter half of the pattern, and 1010or 1011 that is a code of the instruction (1) or (2) is input into a code C1.

The code12 and the code8 are present in the former half of a pattern (10) and the latter half of the pattern (10), respectively. The code A1 is the same as that of the pattern (9), 10001001 or 10001011 that is the code of the instruction (7) or (8) is input into a code B2 of the latter half of the pattern, and 10001101 or 10001111 that is the code of the instruction (3) or (4) is input into a code C2.

The code8 and the code12 are present in the former half of a pattern (11) and the latter half of the pattern (11), respectively. 10001101 or 10001111 that is the code of the instruction (3) or (4) is input into a code A2 in the former half of the pattern, and the codes B1 and C1 are the same as those of the pattern (9).

The code8 is present in both of the former half and the latter half of a pattern (12). Then, the code A2 is the same as that of the pattern (11), and the codes B2 and C2 are the same as those of the pattern (10).

In a case where the code C1 or C2 is used, that is, in a case where when the code Al is used in the former half, the code C1 is used in the latter half, or when the code A2 is used in the former half, the code C2 is broadly used, a variation in pattern increases. On the other hand, because the same code is used in the former half and the latter half of the pattern, the sequential decoding is required for an instruction dispatch of the patttern. According to the present embodiment, because it is assumed that the sequential decoding that does not use the code C1 or C2 is unnecessary, the number of each of the former half and the latter half of the pattern is $2\times 2^{12}+2\times 2^8$=approximately 8.5 k patterns. Thus, approximately 72.25 M patterns are obtained as "the slot undue-exception pattern".

Next, an instruction issuing unit for efficient issuing of the four patterns in FIG. 3 is described. In the superscalar processor according to the present embodiment, the instruction code is classified into a prefix PX, a branch instruction BRD with the delay slot, a branch instruction BR, a load store instruction LS, a load store instruction LSX that cannot be placed in the delay slot, and an arithmetic operation instruction EX, and there are three types of pipelines to execute such an instruction set: a branch pipeline BRP, a load store pipeline LSP, and an arithmetic operation pipeline EXP. Assignment of a high-order 4-bit CODE of the instruction code to an instruction type TYPE is set as illustrated in FIG. 4. Moreover, an instruction type TYPE-DS in the drawing is used in a fourth embodiment described below, and therefore is not described here. Instructions other than the eight instructions referred to in FIG. 1 and FIG. 2 also are classified by a code (CODE) of the high-order 4-bit. The present invention is applicable for any instruction encoding, and this is easy to describe using a specific example. CODE 1000 is used for all of the branch instruction BRD with the delay slot, the branch instruction BR, and the prefix PX. The patterns (3) and (4) in FIG. 1 are the branch instruction BRD with the delay slot, the patterns (7) and (8) in FIG. 2 are the branch instruction BR, and others are the prefix PX.

Next, a configuration of the processor that creates an empty instruction code space using the "slot undue-exception pattern" typically described referring to FIG. 3 is described. Here, an improvement is assumed to be made on the configuration of the processor disclosed in PTL 3.

The data processor MPU according to the present embodiment is illustrated in FIG. 5. The data processor MPU mainly includes a processor core CPU, one or more memories MEM connected to an internal bus IBUS, one or more external interface circuits EIF, one or more built-in peripheral modules PER, and others. The data processor MPU is not particularly limited, but is formed on one semiconductor substrate such as monocrystalline silicon using a CMOS integrated circuit manufacturing technology.

A block configuration of the processor core CPU is illustrated in FIG. 6. An instruction fetch unit IFU is arranged in the vicinity of an instruction cache IC, and includes a pre-decoder PD, a global instruction queue GIQ, and a branch controller BRC in the middle thereof. Furthermore, a load store unit LSU is arranged in the vicinity of a data cache DC and includes a load store instruction queue LSIQ that retains a load store instruction, a load store instruction decoder LSID and a load store instruction execution unit LSE in the middle thereof. Moreover, an arithmetic operation execution unit EXU includes an execution instruction queue EXIQ that retains an arithmetic operation instruction, the arithmetic operation instruction decoder EXID, and an arithmetic operation instruction unit EXE. A bus interface unit BIU is an interface circuit between the processor core CPU and a bus IBUS outside of the processor core CPU.

A configuration of the pipeline of the processor core CPU is illustrated in FIG. 7. First, there are an instruction cache access IC1 and an instruction cache access IC2 that are common to all the instructions, and there is a global instruction buffer GIB stage. Next, there is a local instruction buffer EXIB, a local register read EXRR, an arithmetic operation EX, and each stage of a register write-back WB in an arithmetic operation instruction pipeline EXPL. Furthermore, in a load store instruction pipeline LSPL, there is a local instruction buffer LSIB, a local register read LSRR, the address computation LSA, a data cache access DC1 and a data cache access DC2, and each stage of the register write-back WB. Moreover, a branch BR stage is present in a branch instruction pipeline BRPL.

In the instruction cache access IC1 and the instruction cache access IC2 stage, the instruction fetch unit IFU fetches the instruction code from the instruction cache IC and pre-decodes the instruction code with the pre-decoder PD and subsequently stores the result of the pre-decoding in the global instruction queue GIQ of the global instruction buffer GIB stage. In the global instruction buffer GIB stage, the instructions in categories, that is, the load store, the arithmetic operation, and the branch are extracted one instruction after another using the result of the pre-decoding and others and are dispatched, and in the local instruction buffers LSIB and EXIB and the branch BR stage, is stored in the instruction queue LSIQ of the load store unit LSU, the instruction queue EXIQ of the arithmetic operation execution unit EXU, and the branch controller BRC of the instruction fetch unit IFU, respectively. Then, in the branch BR stage, the branch processing is started immediately when receiving the branch instruction.

In the arithmetic operation instruction pipeline EXPL, the arithmetic operation execution unit EXU enables an instruction queue EXIQ to receive the arithmetic operation instruction by a maximum of one instruction per one cycle in a local instruction buffer EXIB stage, decodes the instruction by a maximum of one instruction in the arithmetic operation instruction decoder EXID, performs register reading in a next local register read EXRR stage, performs the arithmetic operation using the arithmetic operation instruction unit EXE in an arithmetic operation EX stage, and in a case of the register write instruction, stores a result of the processing in a register in a register write-back WB stage.

In the load store instruction pipeline LSPL, the load store unit LSU enables an instruction queue LSIQ to receive the load store instruction by a maximum of one instruction per one cycle in a local instruction buffer LSIB stage, decodes the instruction by a maximum of one instruction in the load store instruction decoder LSID, performs register reading in a next local register read LSRR stage, computes load store address in an address computation LSA stage, performs load store processing in a data cache access DC1 stage and in a data cache access DC2 stage, and in a case of a register write instruction, stores a result of the processing in the register in a register write-back WB stage.

Figure 8:
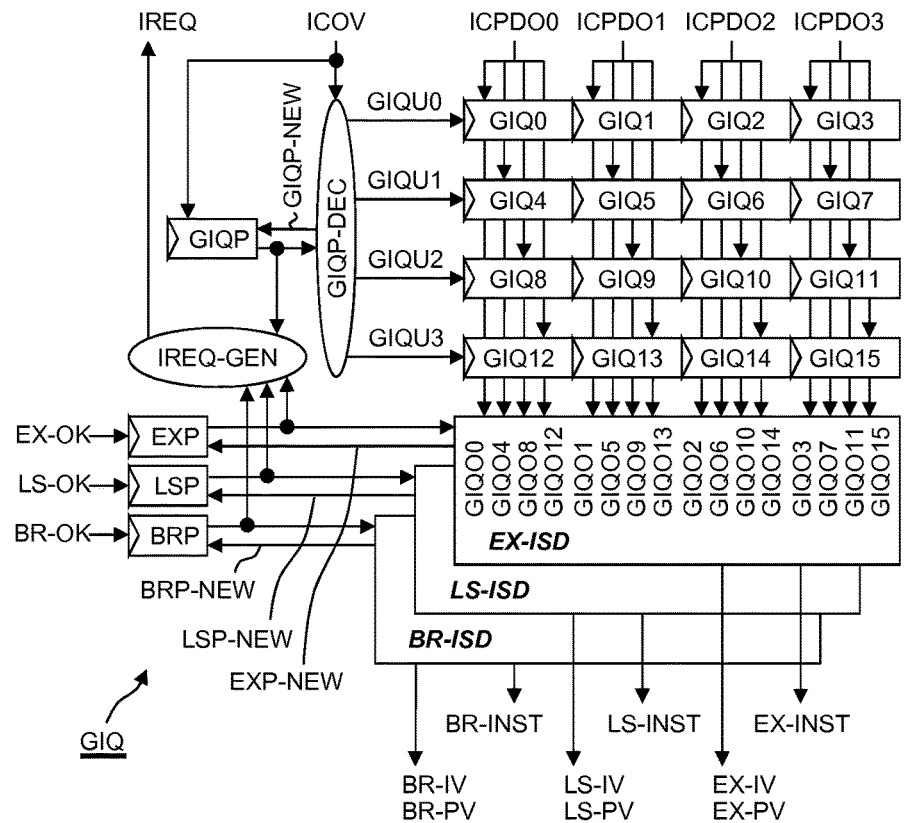
FIG. 8 is a block diagram illustrating a configuration of a global instruction queue GIQ of the data processor according to the present embodiment.

A configuration of the global instruction queue GIQ of the data processor MPU according to the present embodiment is illustrated in FIG. 8. In an example in FIG. 8, the global instruction queue GIQ is made from instruction queue entries GIQ0 to GIQ15 for the 16 instructions, a global instruction queue pointer GIQP that designates a write position, a global instruction queue pointer decoder GIQP-DEC that decodes a global instruction queue pointer GIQP, an arithmetic operation instruction pointer EXP that proceeds to be matched with progress in the instructions of the categories, that is, the arithmetic operation, the load store and the branch, and that designates a reading position, a load store instruction pointer LSP, a branch instruction pointer BRP, an arithmetic operation instruction search dispatch circuit EX-ISD, a load store instruction search dispatch circuit LS-ISD, a branch instruction search dispatch circuit BR-ISD, and an instruction fetch request generation unit IREQ-GEN. The arithmetic operation instruction search dispatch circuit EX-ISD, the load store instruction search dispatch circuit LS-ISD, and the branch instruction search dispatch circuit BR-ISD search for and dispatch the arithmetic operation instruction, the load store instruction, and the branch instructions, respectively, according to their respective pointers.

Figure 12:
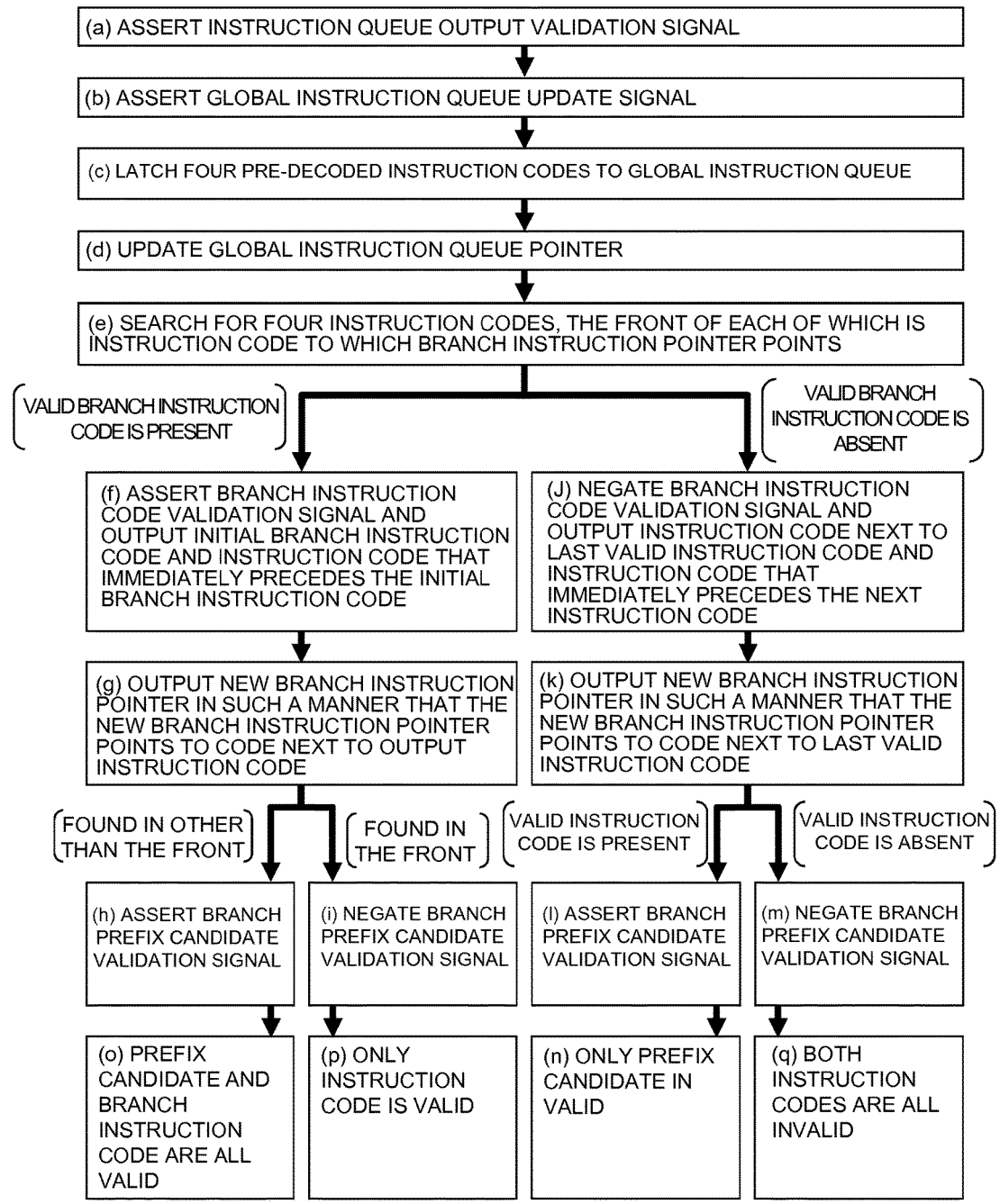
FIG. 12 is a flow chart for describing operation of a global instruction queue GIQ according to a first embodiment.

Next, operation of the global instruction queue GIQ is described referring to a flow chart in FIG. 12. (a) When the instruction cache output validation signal ICOV is asserted, (b) the global instruction queue pointer decoder GIQP-DEC asserts an update signal of an instruction queue entry group that the global instruction queue pointer GIQP points to among the global instruction queue update signal GIQU 0 to 3. (c) Then, in the global instruction queue GIQ among the global instruction queue entry groups GIQO to GIQ3, GIQ4 to GIQ7, GIQ8 to GIQ11, or GIQ12 to GIQ15, corresponding global instruction queue update signals GIQUO to GIQU3 latch four instruction codes ICPDO0 to ICPDO3 that are fetched from the instruction cache IC in the instruction fetch unit IFU and is pre-decoded in the pre-decoder PD, to the group being asserted and validates the latched group. Information indicating the instruction type as a result of the pre-decoding, although is not particularly limited, is added to the instruction code ICPDO0 to ICPDO3. Moreover, (d) a value obtained by adding 1 to the global instruction queue pointer GIQP is output in advance as a new global instruction queue pointer GIQP-NEW, and the global instruction queue pointer GIQP is updated with that value.

The branch instruction search dispatch circuit BR-ISD (e) searches for the four instruction codes, the front of each of which is the instruction code of the branch instruction pointer BRP, from global instruction queue outputs GIQO0 to GIQ15 that are output from the global instruction queue entry GIQ0 to GIQ15, respectively, and (f) in a case where the branch instruction code is present, asserts a branch instruction code validation signal BR-IV and outputs an initial branch instruction code and an initial instruction code that immediately precedes the initial instruction, as a branch instruction BR-INST. When the immediately-preceding instruction code is selected, at the time when it is the prefix, the instruction code qualified by the prefix can be output together. Furthermore, (g) a new branch instruction pointer BRP-NEW is output in such a manner that the branch instruction pointer BRP points to the instruction code next to the instruction code that is output. (h) In a case where the branch instruction code is found in other than the front, the branch prefix candidate validation signal BR-PV is asserted, and (o) based on this, the branch controller BRC determines that both of the branch instruction code and the immediately-preceding instruction code as the branch prefix candidate are valid. (i) In a case where the branch instruction code is found in the front, the branch prefix candidate validation signal BR-PV is negated, and (p) based on this, the branch controller BRC determines that only the branch instruction code is valid.

(j) In a case where the valid branch instruction code is not present in the search range, the branch instruction code validation signal BR-IV is negated, and the code next to the last valid instruction code is regarded as the branch instruction code and is output as the branch instruction BR-INST, along with the instruction code that immediately precedes the last valid instruction code, in such a manner that the last valid instruction code in the search range at this time, which is the branch prefix candidate in case that the branch instruction code is found in the front at the time of the next branch instruction search, is selected as the instruction code that immediately precedes the branch instruction code. The code regarded as the branch instruction code, although it is output, is substantially meaningless in the branch controller BRC, but the outputting of the code is done so that the code may be matched with the control content of output control in a case of the presence of the valid branch instruction code and thus the simplification of control logic may be made easy. Furthermore, (k) the new branch instruction pointer BRP-NEW is output in such a manner that the branch instruction pointer BRP points to the instruction code next to the last valid instruction code. (l) In a case where the valid instruction code is present in a search target, the branch prefix candidate validation signal BR-PV is asserted, and (n) based on this, the branch controller BRC determines that only the immediately-preceding instruction as the branch prefix candidate is a valid input. (m) In a case where the valid instruction is not present in the search target, the branch prefix candidate validation signal BR-PV is negated, and based on this, the branch controller BRC determines that both of the instruction code and the immediately-preceding instruction as the branch prefix candidate are invalid. Moreover, when the invalid instruction is included in the four instructions that are the search target in a case where a range including a group in which the invalid instruction code is present is the search target, among the global instruction queue entry group GIQ0 to 3, GIQ4 to 7, GIQ8 to 11, or GIQ12 to 15. The search operation is described in detail below referring to FIG. 9.

As a result of the control described above, when the branch instruction code validation signal BR-IV and the branch prefix candidate validation signal BR-PV (o) are both asserted, the branch prefix candidate and the branch instruction code are output at the same time, (n) when the branch instruction code validation signal BR-IV and the branch prefix candidate validation signal BR-PV are negated and asserted, respectively, only the branch prefix candidate is precedently output, (p) the branch instruction code validation signal BR-IV and the branch prefix candidate validation signal BR-PV are asserted and negated, respectively, only the branch instruction code is output and is used along with the branch prefix candidate that is precedently output, and (q) when the branch instruction code validation signal BR-IV and the branch prefix candidate validation signal BR-PV are both negated, no valid code is output. Moreover, in a case where the code decoded as the branch prefix candidate is not the branch prefix, the instruction is executed by using only the branch instruction code.

In the same manner, the load store instruction search dispatch circuit LS-ISD also outputs a load store instruction code validation signal LS-IV, a load store instruction LS-INST, a load store prefix candidate validation signal LS-PV, and a new load store instruction pointer LSP-NEW, from global instruction queue outputs GIQO0 to 15, according to the load store instruction pointer LSP. Furthermore, the arithmetic operation instruction search dispatch circuit EX-ISD also outputs an arithmetic operation instruction code validation signal EX-IV, an arithmetic operation instruction EX-INST, an arithmetic operation prefix candidate validation signal EX-PV, and a new arithmetic operation instruction pointer EXP-NEW, from the global instruction queue outputs GIQO0 to 15, according to the arithmetic operation instruction pointer EXP.

The instruction fetch request generation unit IREQ-GEN determines from values of each pointer GIQP, EXP, LSP, and BRP whether one entry group or more is empty in either the global instruction queue entry groups GIQ0 to 3, GIQ4 to 7, GIQ8 to 11, or GIQ12 to 15 and if one entry group or more is empty, asserts the instruction fetch request signal IREQ. A state where no entry group is empty is a state where none of each pointer EXP, LSP, and BRP points to the global instruction queue entry group that latches the instruction codes ICO 0 to 3 that are next fetched, to which the global instruction queue pointer GIQP points. Moreover, the instruction fetch request signal IREQ can be generated one cycle earlier if the instruction fetch request signal IREQ is generated from each new pointer GIQP-NEW, EXP-NEW, LSP-NEW, and BRP-NEW instead of each pointer, the instruction cache output validation signal ICOV that is a update signal of the global instruction queue pointer GIQP, and each of the pointer update control signals EX-OK, LS-OK, and BR-OK. Moreover, depending on signal timing with respect to the instruction cache IC that receives the instruction fetch request signal IREQ, various timing methods are considered, such as a method in which the creating is made from the pointer, a method in which the creating is made from the new pointer, and a method in which the latching is performed after the creating and then the transmission to the instruction cache IC is made.

Figure 9:
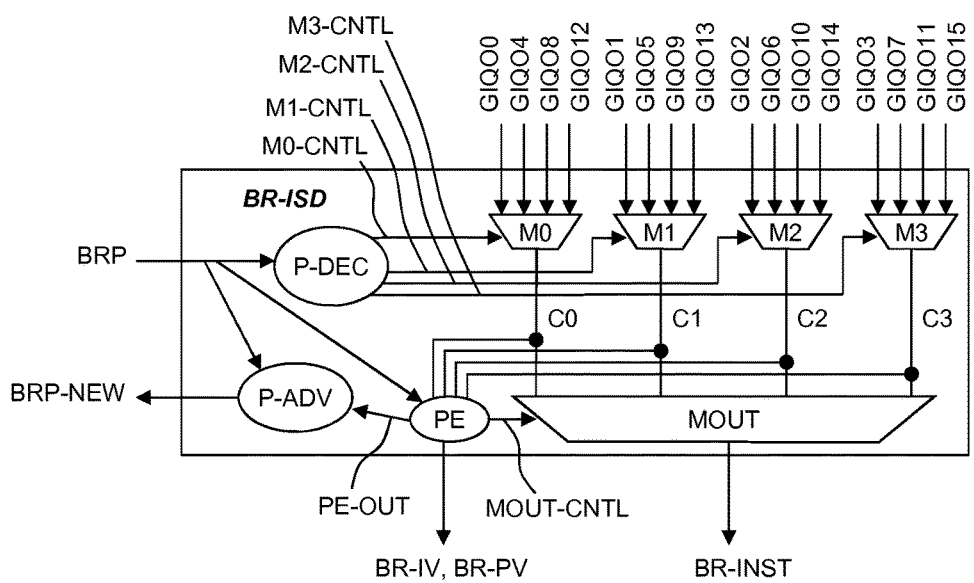
FIG. 9 is a block diagram illustrating a configuration of a branch instruction search dispatch circuit BR-ISD of a global instruction queue GIQ in FIG. 8.

FIG. 9 illustrates a configuration of the branch instruction search dispatch circuit BR-ISD of the global instruction queue GIQ in FIG. 8. The branch instruction search dispatch circuit BR-ISD is configured from a pointer decoder P-DEC, instruction code multiplexers M0 to M3, a priority encoder PE, an output instruction code multiplexer MOUT, and a pointer update circuit P-ADV. The pointer decoder P-DEC decodes the branch instruction pointer BRP and generates control signals M0-CNTL to M3-CNTL of the instruction code multiplexers M0 to M3 in such a manner that the four instruction codes, the front of each of which is the instruction code to which the branch instruction pointer BRP points are selected. The instruction code multiplexers M0 to M3 select one instruction code from GIQO0, 4, 8, and 12, GIQO1, 5, 9, and 13, GIQO2, 6, 10, and 14, GIQO3, 7, 11, and 15 according to control signals M0-CNTL to M3-CNTL, respectively, and search-target output instruction codes C0 to C3, respectively. As a result, instruction order is given cyclically beginning with the front instruction code, without assigning fixed order to the search-target instruction codes C0 to C3. The priority encoder PE starts searching for the search-target instruction codes C0 to C3 by performing priority encoding, beginning with the front instruction code to which the branch instruction pointer BRP points and searches for the initial branch instruction code. Then, in a case where the branch instruction is found, the instruction code is selected, when, in a case where the branch instruction is not found, the invalid instruction code is present, the initial instruction code thereof is selected, and when, in the case where the branch instruction code is not found, the invalid instruction code is not present, the front instruction code is selected, and an output instruction code multiplexer control signal MOUT-CNTL is output in such a manner that the instruction code that immediately precedes the selected instruction code is selected. Moreover, in a case where the front instruction code is selected as the branch instruction code, the instruction code that immediately precedes the front instruction code cannot be selected because it is not the search target at this time. The order is as follows: the search-target instruction code C0, the search-target instruction code C1, the search-target instruction code C2, the search-target instruction code C3. Because this order is cyclic, the last code of the search target is selected as the immediately-preceding instruction code. Thereafter, in a case where the branch instruction is found in the first, second, third, and fourth instruction codes, 1, 2, 3, and 4 each are added to the instruction pointer BRP, and in a case where the branch instruction is not found, a value obtained by adding the number of the valid instruction codes that are searched for is output as the new branch instruction pointer BRP-NEW.

In a case where because the following order: the search-target instruction code C0; the search-target instruction code C1; the search-target instruction code C2; the search-target instruction code C3; is cyclic, the branch instruction code is not found, the last valid instruction code that is present in case that the branch instruction is found in the front at the time of the next branch instruction search is selected as the immediately-preceding instruction code and is output, and the last valid instruction code, although it is the prefix of the branch instruction, is properly selected and is output. That is, in a case where when searching for the new branch instruction, the front instruction code that is, the search target is the branch instruction, an instruction is given such that the branch prefix candidate validation signal BR-PV is negated and the branch prefix candidate already retained by the branch controller BRC is used without using the branch prefix candidate that is output at the same time as one part of the branch instruction code BR-INST. Moreover, in either of the case where the branch instruction code is found and the case where the branch instruction code is not found, the code that is output as the branch instruction code BR-INST is regarded as a pair of the instruction code and the instruction code that immediately precedes the instruction code, and in either case, it is easy for output control logic of the branch instruction code BR-INST to have partial commonality, and this can contribute to the simplification of the logic scale of the output control logic.

The load store instruction search dispatch circuit LS-ISD and the arithmetic operation instruction search dispatch circuit EX-ISD also have the same construction as the above-described branch instruction search dispatch circuit BR-ISD.

With the control described above, it is possible to issue not only an instruction with the prefix but also an instruction without the prefix in every cycle for every instruction type, and the superscalar instruction can be efficiently issued in the instruction set including the instruction with the prefix. Furthermore, if a quantity of immediately-preceding instruction code that is added to the found instruction code is increased from one to two or more, it is possible to apply the above-described control method to an instruction set architecture that allows the multiple prefix codes, and this can contribute to the efficient issuing of the superscalar instruction.

The configuration described so far is in association with the processor configuration by the inventor disclosed in PTL 3, and a case where pairing processing is performed on the branch instruction with the delay slot and the delay slot instruction is described based on the configuration described so far. In this case, the branch instruction with the delay slot in the former half of the pattern is selected by the branch instruction search dispatch circuit BR-ISD in FIG. 8 and is output as the branch instruction BR-INST. However, because the latter half of the pattern that is paired with the branch instruction with the delay slot follows, the decoder is configured in such a manner that the branch instruction with the delay slot in the former half of the pattern, although it is the branch instruction, is not executed. That is, the dispatching by the branch instruction search dispatch circuit BR-ISD in such a case becomes the useless dispatching, but the undue exception of the slot does not occur, and that is simply canceled. In summary, such a function is added to an instruction decoder.

On the other hand, the delay slot instruction in the latter half of the pattern is selected by the arithmetic operation instruction search dispatch circuit EX-ISD, the load store instruction search dispatch circuit LS-ISD, or the branch instruction search dispatch circuit BR-ISD according to the instruction type, and the branch instruction with the delay slot is added, as the prefix, to the delay slot instruction in the latter half of the pattern, resulting in being output as the arithmetic operation instruction EX-INST, the load store instruction LS-INST, or the branch instruction BR-INST. That is, the pair of the branch instruction with the delay slot and the delay slot instruction is output. Then, in a case where the pair is the "slot undue-exception pattern," proceeding to exception handling takes place.

According to the present embodiment, among the "slot undue-exception patterns," the patterns (9), (10), (11) and (12) defined in FIG. 3 are executed as 32-bit instructions and the undue exception of the slot does not occur. The latter-half 16-bit of the pattern defined in FIG. 3 is any one of the patterns (1) to (8) in FIG. 1 and FIG. 2. According to the instruction dispatch method in FIG. 8, described above, the latter-half 16-bit of the pattern, if it is the pattern (5) or (6), is handled as the load store instruction LS-INST, and the latter-half 16-bit of the pattern, if it is among the other patterns, is handled as the branch instruction BR-INST. Therefore, a definition of the instruction that is executed in the same pipeline as the above-described latter half of the pattern is included in the definition of the instruction.

The branch controller BRC in FIG. 6 decodes the branch instruction BR-INST that is made from the branch instruction code and the instruction code that immediately precedes the branch instruction code and controls the instruction fetch unit IFU, thereby managing an instruction flow. As described referring to the flowchart in FIG. 12, four types of states, the states (o), (p), (n), and (q) are present in the branch instruction BR-INST according to the values of the branch instruction code validation signal BR-IV and the branch prefix candidate validation signal BR-PV. The decoding operation of the branch controller BRC in each case is described based on FIG. 14A and FIG. 14B.

Figure 14A:
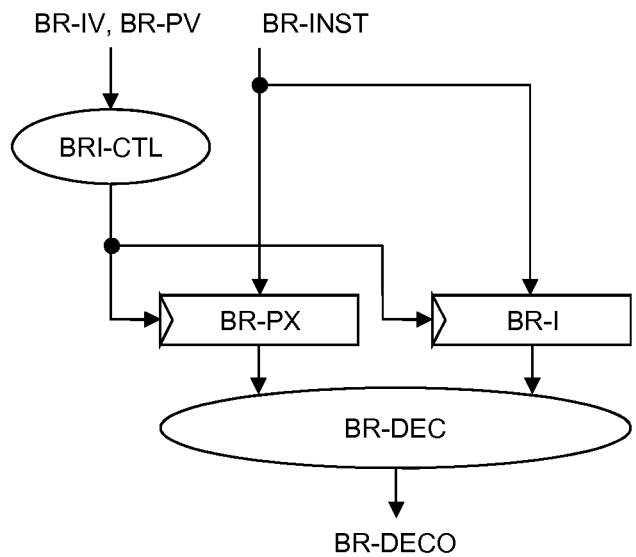
FIG. 14A is a block diagram illustrating a configuration of a decoder of a branch controller BRC that has a one-step branch instruction buffer.
Figure 14B:
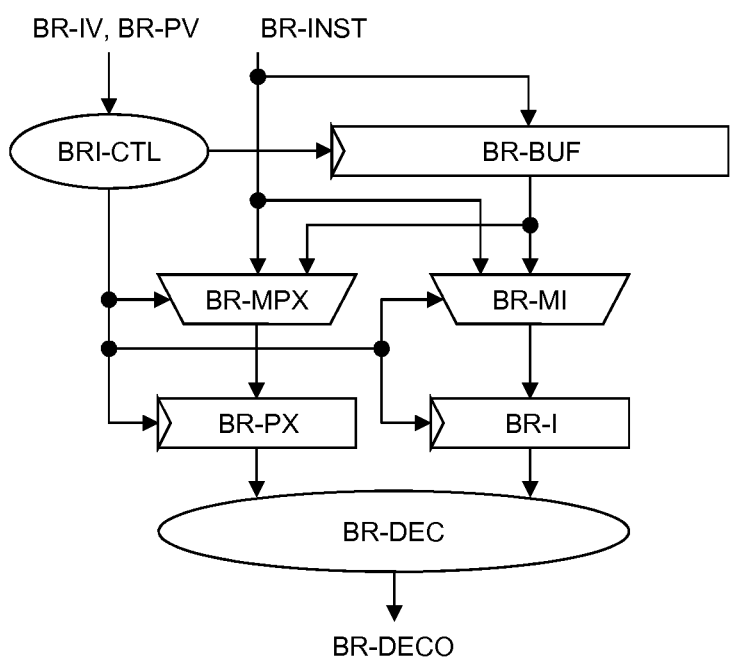
FIG. 14B is a block diagram illustrating a configuration of the decoder of the branch controller BRC that has a multi-step branch instruction buffer.

FIG. 14A illustrates an example of a one-step branch instruction buffer, which is made from a branch prefix latch BR-PX and the branch instruction latch BR-I. On the other hand, FIG. 14B illustrates an example of a multiple-step branch instruction buffer, which retains a one-or-more step branch instruction buffer BR-BUF, controls a branch prefix multiplexer BR-MPX and a branch instruction multiplexer BR-MPI, and properly selects the instruction code that enables the branch prefix latch BR-PX and the branch instruction latch BR-I to perform latching. In case that the buffer has the multiple steps without being limited to the present invention, in such a case as one where the instruction issuing is stalled, there occurs sufficient room for the timing in case that action is taken to stop the instruction supply side. Furthermore, in case that the buffer has the multiple steps, this helps to tolerate deviation in the cycle of the instruction flow execution from other pipelines at the time of out-of-order issue. The following description is provided based on FIG. 14A, but it is possible for a person of ordinary skill in the art to easily extend the branch instruction buffer in FIG. 14B to the case of the multiple steps. Thus, the description based on FIG. 14B is omitted here. Furthermore, although not illustrated, in a case where the supplied branch instruction BR-INST cannot be latched due to a restriction to buffer capacitance, a signal indicating that the buffer is full is transmitted to the instruction supply side and the stopping of the instruction supply is performed.

First, in a case where the branch prefix candidate in (o) of FIG. 12 and the branch instruction code are valid at the same time, a branch instruction input control circuit BRI-CTL determines from the branch instruction code validation signal BR-IV and the branch prefix candidate validation signal BR-PV that this state is the case, controls the branch prefix latch BR-PX and the branch instruction latch BR-I, and supplies the branch instruction BR-INST as the branch prefix candidate and the branch instruction to a branch instruction decoder BR-DEC. In a case where the branch prefix candidate is actually the prefix, the branch instruction decoder BR-DEC decodes the branch prefix candidate as a branch instruction with the prefix, generates a control signal BR-DECO and proceeds with the branch processing. In a case where the branch prefix candidate is not the prefix, the branch instruction decoder BR-DEC decodes the branch prefix candidate as a normal branch instruction, generates the control signal BR-DECO and proceeds with the branch processing.

Next, in a case where only the branch prefix candidate in (n) of FIG. 12 is precedently valid, like in a case of (o), it is determined that this state is the case, the branch prefix latch BR-PX is controlled, the former-half portion of the branch instruction BR-INST is supplied, as the branch prefix candidate, to the branch instruction decoder BR-DEC. Then, it is necessary to await the arrival of the branch instruction code.

Next, in a case where only the branch instruction code in (p) of FIG. 12 is valid, like in a case of (o), it is determined that this state is the case, the branch latch BR-I is controlled, the latter-half portion of the branch instruction BR-INST is supplied, as the branch instruction, to the branch instruction decoder BR-DEC. Then, if the precedently-supplied branch prefix candidate is valid, the precedently-supplied branch prefix candidate is used together and is processed in the same manner as in the above-described (o). On the other hand, if the branch prefix candidate is not precedently supplied such as immediately after the branch, the branch prefix candidate is processed as the normal branch instruction.

Then, in a case where no valid code in (q) of FIG. 12 is present, it is necessary to await the arrival of the valid code.

The following operational effects according to the first embodiment are obtained. The 16-bit fixed-length instruction set is present that includes the branch instruction with the delay slot. The delay slot is a slot into which the instruction that follows the branch instruction is input, and the instruction present in such a slot (the delay slot instruction) is executed before the branch destination instruction. Normally, such a slot is one instruction equivalent. Furthermore, when an exception or an interruption occurs between the branch instruction and the delay slot instruction, because the processing resumes beginning with the delay slot instruction and the branch instruction is not processed accurately, a way of inseparably executing both is common. Moreover, because the branch instruction changes the PC, it is general that the delay slot instruction prohibits the instruction that refers to or changes the PC. As a result, the pair of one branch instruction and one delay slot instruction is handled as the 32-bit length instruction, and the prohibited combination pattern is handled as the undue exception of the slot and is not utilized. According to the embodiment, a 32-bit instruction set is defined by utilizing the prohibition pattern, that is, a "32-bit pattern by a pair of one branch instruction with the delay slot and one instruction that is not placed in the delay slot," and thus the instruction code space can be extended. This pattern is hereinafter referred to as the "slot undue-exception pattern." For example, the code space of the four representative branch instructions with the delay slot is $2^{13}+2^9=8.5$ k patterns. On the other hand, the code space of the eight representative instructions that cannot be placed in the delay slot is $2^{14}+2^{10}=17$ k patterns. Therefore, the number of the representative combination patterns that are handled as an exception is approximately 144.5 M, a product of 8.5 k and 17 k.

Because in the above-described "slot undue-exception pattern," the branch instruction with the delay slot is also the instruction that cannot be placed in the delay slot, the branch instruction with the delay slot can be present in the former half of the pattern or present in the latter half of the pattern. Then, because when the branch instruction with the delay slot comes one after another, the odd-numbered branch instruction is the former half and the even-numbered branch instruction is the latter half, the sequential decoder is necessary to distinguish between the former half and the latter half, and thus the speed is difficult to increase. To avoid this problem, as described according to a separate embodiment, among the eight representative instructions that cannot be placed in the delay slot, the instructions other than the branch instruction with the delay slot may be utilized. Each code space of the four representative branch instructions with the delay slot and the remaining four instructions is $2^{13}+2^9=8.5$ k patterns. Therefore, the number of the patterns that can be efficiently issued in a manner that enables superscalar instruction is approximately 72.25 M, half of the number of the "slot undue-exception patterns."

The instruction code is classified into the prefix, the branch instruction with the delay slot, the branch instruction, the load store instruction, and the arithmetic operation instruction, and a superscalar processor is considered that has three types, that is, the branch, the load store and the arithmetic operation pipeline, as the execution pipeline. It is possible for a person of ordinary skill in the art to extend this processor, for example, to a processor that additionally has a floating point arithmetic operation instruction as a separate classification and additionally has the execution pipeline for a floating point arithmetic operation.

First, in a case where the branch instruction with the delay slot is not present, each of the branch instruction, the load store instruction, and the arithmetic operation instruction is searched for in every cycle. Thus, if each instruction falls within the search scope, the instruction is issued and the code that immediately precedes the instruction is regarded as the prefix. Thus, the code is issued to the instruction, and the code added to the instruction is dispatched to each execution pipeline. And the decoder of each execution pipeline checks whether or not the code that is added to the instruction is the prefix and if the code is the prefix, performs the instruction decoding also using that prefix, and thus can superscalar-issue the instruction with the prefix as well. Although the branch instruction with the delay slot is present, special processing is unnecessary after dispatching, and thus the branch instruction with the delay slot may be dispatched to the branch pipeline and the delay slot instruction may be dispatched to the execution pipeline for the delay slot instruction. Then, the switching to a flow of the instruction fetch and dispatch is delayed by one instruction, compared to the normal branch instruction. Because in a case where the undue exception of the slot and others occur, high-speed processing is unnecessary, proceeding to the proper exception handling may not take place.

As described according to the first embodiment, by utilizing the "slot undue-exception pattern," new 32-bit instructions, approximately 144.5 M patterns, can be defined, and performance or efficiency can be improved by extension in number of the instructions. Furthermore, the mode of controlling the instruction fetch and the instruction decoding is a method that is the smallest in change, compared to a method in which the "slot undue-exception pattern" is not used (Second Embodiment)

The instruction control mode of utilizing the "slot undue-exception pattern" described according to the first embodiment ends without changing a dispatch mechanism, but there is a factor that has to be taken into consideration. That is, because in a case where the instruction code is the "slot undue-exception pattern," the branch instruction with the delay slot in the former half of the pattern is dispatched, as the branch instruction, to the branch pipeline, but the latter half of the pattern does not follow, the branch instruction with the delay slot, although it is the branch instruction, cannot executed, and there occurs useless dispatching. That is, because the latter half of the pattern is regarded as the instruction and is dispatched, and the former half of the pattern is added as the prefix candidate therefor, the limitation is necessary that the latter half of the pattern and the "slot undue-exception pattern" should be instruction codes executed in the same execution pipeline.

According to a second embodiment, in order to avoid this, the definition of the instruction by the "slot undue-exception pattern" is set as being dedicated to the branch instruction and the branch instruction is used as the latter-half pattern thereof. That is, only the six patterns, the patterns (1) to (4) in FIG. 1 and the patterns (7) and (8) in FIG. 2, are used as the latter-half 16-bits of the pattern defined in FIG. 3. Then, the prefix is not used in the branch instruction.

According to the second embodiment, the branch instruction search dispatch circuit BR-ISD of the global instruction queue GIQ in FIG. 8, not only the selected instruction code but also the instruction code that immediately follows the selected instruction code, is output in a case where the branch instruction is defined by the "slot undue-exception pattern." According to the first embodiment, the instruction code that immediately precedes the selected instruction code is output at the same time in a case where the prefix is present, but according to the second embodiment, because the prefix is not used in the branch instruction, the immediately-preceding instruction code is unnecessary. In summary, according to the first embodiment, the instruction code that immediately precedes the selected instruction code is also output together by understanding the former half of the prohibition pattern as the prefix, but according to the second embodiment, the instruction code that immediately follows the selected instruction code is also output together by understanding the latter half of the prohibition pattern as the postfix. Therefore, according to the second embodiment, BR-PV in FIG. 8 is set as a postfix candidate validation signal. Then, in a case where the postfix candidate validation signal BR-PV is found in the last valid instruction code of the search-target instruction codes C0 to C3 in FIG. 9, the postfix candidate validation signal BR-PV is negated. Then, in a case where the postfix candidate validation signal BR-PV is asserted, a new branch instruction pointer BRP-NEW is output in such a manner that the branch instruction pointer BRP points to the instruction code next to the instruction code that is output as in the first embodiment. In a case where the postfix candidate validation signal BR-PV is negated, the new branch instruction pointer BRP-NEW proceeds one less than in the first embodiment. Furthermore, because the prefix is not present, a case does not need to be considered in which the last code of the valid instruction code, the search target, which is described according to the first embodiment, is the prefix.

Figure 13:
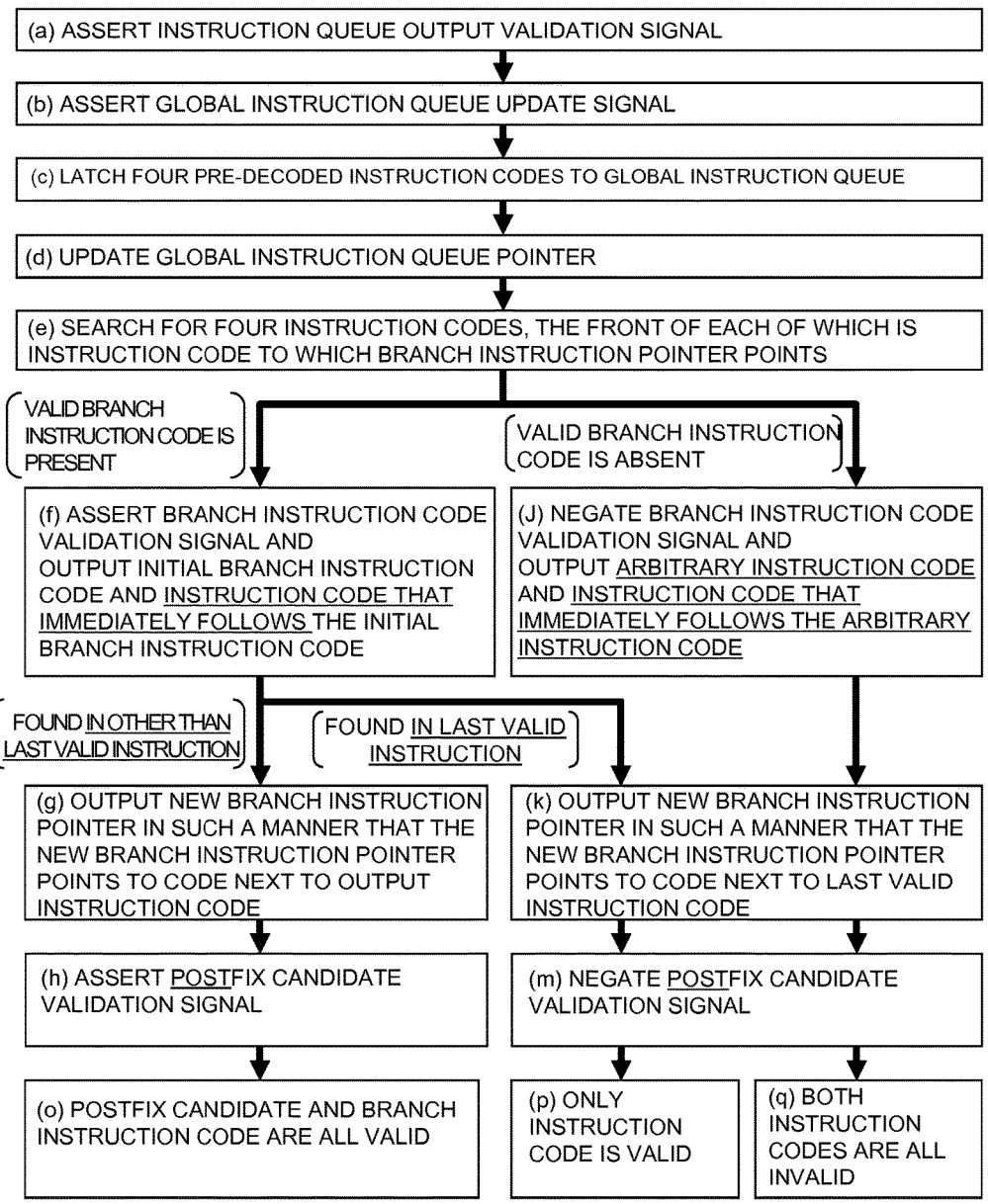
FIG. 13 is a flow chart that corresponds to FIG. 12 for describing the operation of the global instruction queue GIQ according to a second embodiment.

Because a change is made from the first embodiment as described above, the flowchart in FIG. 12 is changed to that in FIG. 13. What is different from FIG. 12 is described below based on FIG. 13. In FIG. 13, a main portion that is changed from that in FIG. 12 is underlined.

First, (a) to (e) are the same. In (f), a change is made in such a manner that instead of the immediately-preceding instruction code, the immediately-following instruction code is output. The unconditional proceeding to (g) after (f) is changed in such a manner that in a case where the instruction code is "found in other than the last valid instruction," the proceeding to (g) takes place and is changed in such a manner that the proceeding to (g) does not take place, the proceeding to (k) takes place. A change is made in such a manner that the proceeding to (i) from (g) in a case where the instruction code is "found in the front" is deleted and the unconditional proceeding to (h) takes place, and the branch prefix in (h) is changed to the postfix. Next, because the case in which the last code of the valid instruction code, the search target, is the prefix, does not need to be considered, in (j), a change is made in such a manner that an arbitrary instruction code and an instruction code that immediately follows the arbitrary are output. A change is made in such a manner that the proceeding to (l), from (k) in a case where the "valid instruction code is present" is deleted and the unconditional proceeding to (m) takes place. The branch prefix in (m) is changed to the postfix.

In a case where the postfix candidate validation signal BR-PV is negated in the four instructions (1) to (4) of FIG. 1 in each of which the former-half portion of the branch instruction BR-INST is the "branch instruction with the delay slot," the latter-half portion is not present. For this reason, it is not possible to distinguish between the normal "branch instruction with the delay slot" and the "slot undue-exception pattern," and thus the branch controller BRC of the instruction fetch unit IFU in FIG. 6 cannot process the received instruction. However, because only the branch instruction is used as the latter-half portion of the "slot undue-exception pattern," the next time the search for the branch instruction succeeds, the latter-half portion of the "slot undue-exception pattern" is output as the former-half portion of the branch instruction BR-INST the search for which succeeds at this time. By using this as the latter-half portion of the "slot undue-exception pattern" thereof, the processing is possible.

Furthermore, if the latter-half portion and the former-half portion of the branch instruction BR-INST are not used at the same time and the latter-half portion is the branch instruction, the latter-half portion is used as the next former-half portion in such a manner that the processing is performed in succession to the preceding branch instruction. At this time, if the former-half portion of the next branch instruction BR-INST arrives additionally, the former-half portion of the next branch instruction BR-INST, although it is the "branch instruction with the delay slot," can be processed in the same manner as in the case where the above-described postfix candidate validation signal BR-PV is negated. In a case where the former-half portion of the next branch instruction BR-INST does not arrive, it is necessary to await the arrival of the former-half portion before starting the processing.

Furthermore, if the former-half portion of the next branch instruction BR-INST is not "the branch instruction with the delay slot," regardless of whether or not the former-half portion of the next branch instruction BR-INST arrives, the processing starts. At this time, because when the former-half portion of the next branch instruction BR-INST arrives, the processing of the branch controller BRC is delayed with the supply of the branch instruction BR-INST, the branch instruction BR-INST is buffered, and the global instruction queue GIQ is requested to stall the supply. In case that the processing is not performed on time, issuing a request for the stalling from the downstream side of the processing is a common method in the processor.

The following operational effects according to the second embodiment are obtained.

The "slot undue-exception pattern" is dedicated to the branch instruction, the branch instruction is used as the latter-half pattern thereof, and the prefix is not used in the branch instruction. In this case, when dispatching the branch instruction, the code that immediately follows the instruction, not the code that immediately precedes the instruction is added, and when the instruction is the "slot undue-exception pattern," the decoder of the branch pipeline uses the added code as well. Thus, the proper decoding of the "slot undue-exception pattern" is possible. Therefore, an occurrence of the useless dispatching can be avoided. Then, new 32-bit branch instructions, approximately 76.5 M patterns, although smaller than those in the first embodiment, can be defined, and extension in number of the instructions can contribute to improving performance or efficiency.

(Third Embodiment)

According to the second embodiment, the instruction definition by the "slot undue-exception pattern" is limited to the dedication to the branch instruction. According to the present invention, because the "slot undue-exception pattern" is utilized in other than the branch instruction, an instruction code type determination mechanism is changed, and information on the result of determining the instruction code type in the 16-bit unit is exchanged between the adjacent codes at the time of the instruction code type determination. Thus, the "slot undue-exception pattern" can be detected. That is, the same code is prevented from being used in the former-half portion and the latter-half portion of the "slot undue-exception pattern." Specifically, the branch instruction with the delay slot and the instruction that cannot be placed in a delay slot other than the branch instruction with the delay slot are used in the former-half portion and the latter-half portion, respectively. Then, the former half of the pattern is handled in the same manner as the prefix, and the latter half of the pattern is handled in the same manner as any one of the branch instruction, the load store instruction, and the arithmetic operation instruction. In the classification in FIG. 4, the instructions are classified by an instruction type TYPE-DS as the latter-half portion of the "slot undue-exception pattern." As a result, the instruction is freely assigned to the "slot undue-exception pattern," and can be thus handled in the same manner as the instruction with the prefix. An instruction code distribution function of the dispatch circuits EX-ISD, LS-ISD, and BR-ISD at this time is the same as illustrated in FIG. 12.

Specific integration is possible by changing the instruction code type determination in the pre-decoder PD of the instruction fetch unit IFU in FIG. 6, in the processor configuration described referring to FIG. 5 to FIG. 9 according to the first embodiment. Moreover, a function somewhere from the instruction fetch to the instruction search may be performed such as a case where in other than the pre-decoder PD, the instruction code type determination is performed on the search-target instruction codes C0 to C3 of the branch instruction search dispatch circuit BR-ISD in FIG. 9. However, in a case where the instruction code type determination is performed on the search-target instruction codes C0 to C3, because order relation is not constant, a circuit becomes complex.

Figures 10, 11:
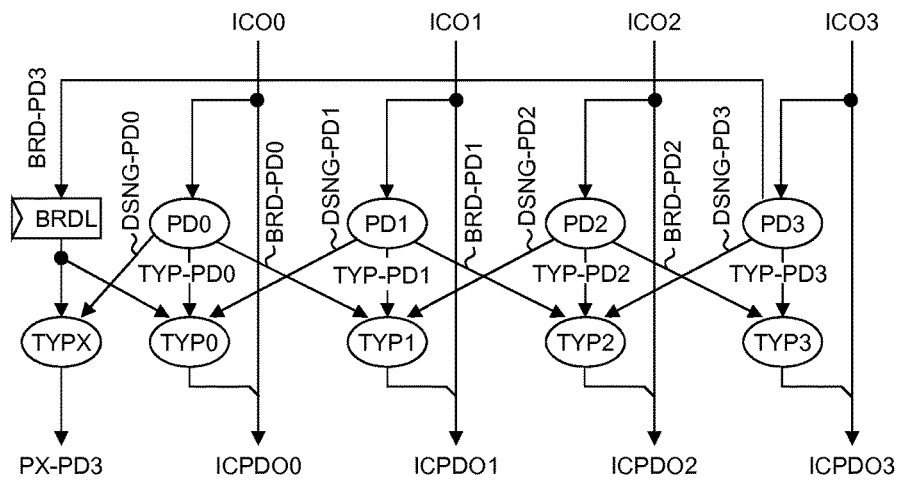
FIG. 10 is a block diagram illustrating a configuration of a pre-decoder according to a third embodiment.
FIG. 11 is an explanatory view illustrating an instruction that stores a result of executing an operand with a 12-bit instruction in a register, the operand being given as an instruction that receives attention in a fifth embodiment that extends a code space resulting from a meaningless combination of two instructions such as successive loads to the same register.

FIG. 10 illustrates one example of the pre-decoder PD in FIG. 6 according to the present embodiment. First, four instructions, instruction codes ICO0 to ICO3, which are fetched from the instruction cache IC in the instruction fetch unit IFU are pre-decoded by pre-decoders PD0 to PD3 of the instruction codes, respectively. Then, among normal six types, instruction types TYPE in FIG. 4, it is determined whether or not each of the instruction codes ICO0 to ICO3 is a branch instruction with the delay slot BRD, and whether or not each of the instruction codes ICO0 to ICO3 is the instruction that cannot be placed in the delay slot other than the branch instruction with the delay slot BRD, that is, the branch instruction BR, the load store instruction LSX that cannot be placed in the delay slot, or the prefix PX. Then, according to results of the determinations, the branch signals with the delay slot BRD-PD0 to BRD-PD3, and the delay slot disapproval signals DSNG-PD0 to DSNG-PD3 are output, respectively. Moreover, because when the 32-bit instruction is present in the delay slot, an instruction issuing mechanism becomes complex, the prefix PX is also classified into the instruction code that cannot be placed in the delay slot and is used as the latter-half portion. Furthermore, results TYP-PD0 to TYP-PD3 of determining the instruction type TYPE are output.

Then, in a case where the branch signals with the delay slot BRD-PD0 to BRD-PD3 from the adjacent preceding instruction are asserted, instruction type adjustment circuits TYP0 to TYP3 output the instruction type TYPE-DS in the case of the "slot undue-exception pattern," as the instruction type. In a case where the branch signals with the delay slot BRD-PD0 to BRD-PD3 from the adjacent preceding instructions are negated, the instruction type adjustment circuits TYP0 to TYP3 output TYP-PD0 to TYP-PD3 as are. Moreover, either the adjacent preceding instruction is the branch signal with the delay slot BRD-PD3 that results from the previous pre-decoding or the adjacent preceding instruction is not present because it is the front instruction code of the branch destination. Because of this, an instruction type adjustment circuit TYP0 latches the adjacent preceding instruction to a latch BRDL in the former case and clears a value of the latch BRDL in the latter case. In both cases, the instruction type adjustment circuit TYP0 uses the output of the latch BRDL. Furthermore, in a case where the instruction type is the branch instruction with the delay slot BRD, and in a case where the delay slot disapproval signals DSNG-PD1 to DSNG-PD3 from their respective adjacent following instructions are asserted, the instruction type adjustment circuits TYP0 to TYP2 change the instruction type to the prefix PX. Then, the outputs of the instruction type adjustment circuits TYP0 to TYP3 are added to the instruction codes ICO0 to ICO3 and are set as pre-decoder outputs ICPDO0 to ICPD03.

Because a signal from the adjacent following instruction is not present, the instruction type adjustment circuit TYP3 cannot confirm the instruction type when the instruction type is the branch instruction with the delay slot BRD. Because of this, the instruction type is regarded as the branch instruction with the delay slot BRD and thus is confirmed as the instruction type, and is added to an instruction code ICO3 and thus is set as a pre-decoder output ICPD03. Thereafter, in a case where the instruction type turns out to be the "slot undue-exception pattern," the instruction type is changed to the prefix PX by a prefixing signal PX-PD3 described below. Moreover, because the pre-decoder output ICPD03 is latched by the global instruction queue GIQ in FIG. 8, a value obtained by the latching is enabled to be updated by the prefixing signal PX-PD3.

The prefixing signal PX-PD3 is generated in the instruction type adjustment circuit TYPX. When the branch signal with the delay slot BRD-PD3 that is latched to the latch BRDL and the delay slot disapproval signal DSNG-PD0 from the pre-decoder PD0 are asserted together, the prefixing signal PX-PD3 is asserted.

The following operational effects according to the third embodiment are obtained.

The instruction code determination mechanism needs to be changed in order to utilize the "slot undue-exception pattern" without being dedicated to the branch instruction. Because the "slot undue-exception pattern" cannot be detected in the determination of the instruction code in the 16-bit unit, the information on the result of determining the instruction code in the 16-bit unit is exchanged between the adjacent codes and thus the "slot undue-exception pattern" can be made to be detected. Then, the former half of the pattern is handled in the same manner as the prefix, and the latter half of the pattern is handled in the same manner as any one of the branch instruction, the load store instruction, and the arithmetic operation instruction. As a result, the instruction can be freely allocated to the "slot undue-exception pattern." In summary, the output of the pre-decoder PD is changed by exchanging the information between the adjacent codes, and thus the "slot undue-exception pattern" can be handled in the same manner as the instruction with the prefix. Then, new 32-bit instructions, approximately 80.75 M patterns, which are greater than those in the second embodiment, can be defined, and extension in number of the instructions can contribute to improving performance or efficiency.

(Fourth Embodiment)

According to the third embodiment, priority is given to the ease of the integration and the information on the result of determining the instruction code type in the 16-bit unit is exchanged between the adjacent codes and thus the encoding of the instruction is limited in such a manner that the "slot undue-exception pattern" can be detected. However, although the above-described limitation is imposed on a processor into which a 16/32-bit length-mixed instruction set, there is no merit. Therefore, without imposing any limitation, the "slot undue-exception patterns," approximately 144.5 M patterns have to be used in defining the new 32-bit instruction definition.

In the 16/32-bit length-mixed instruction set, there is a case where the latter-half portion of the 32-bit length instruction has the same code as the former-half portion of the 16- or 32-bit length instruction. Thus, it is possible to first determine which code is the latter-half portion of the 32-bit length instruction and which code is not, by sequentially analyzing the instruction types of all instructions that precede that code. Because of this, in a case of the determination at the time of the pre-decoding after the instruction fetch, the sequential analysis of as many as the instruction codes to fetch at a time needs to be made within the instruction fetch cycle. In a case of fetching in every cycle, one cycle or less is a minimum condition, and in a case where one cycle is not applied to the pre-decoding, the sequential analysis needs to be ended within the time equivalent to one cycle. Therefore, in a case where an instruction fetch range is great, the likelihood that the sequential analysis will create a bottle neck is increased, but if the instruction fetch range is small, a critical problem does not occur. Furthermore, there is also a method of performing the pre-decoding before the search for the instruction or the issuing of the instruction, and if each of the ranges of the search for the instruction and the issuing of the instruction is small, the problem is decreased.

A difference between the normal 32-bit length instruction and the "slot undue-exception pattern" is that the former is determined as being the former-half portion and having either 16- or 32-bit length and that it is not determined which portion even the latter-half portion is when not viewed.

Then, in a case where the "slot undue-exception pattern" is not utilized, although the delay slot instruction is not fetched, the branch instruction with the delay slot can be processed. In contrast, in a case where the "slot undue-exception pattern" is utilized, the branch instruction with the delay slot is processed after being fetched, but starts to be executed on the assumption that the "slot undue-exception pattern" is not the "slot undue-exception pattern," and thus when the assumption is wrong, needs processing that determines whether or not to perform canceling. However, because the delay slot instruction is not fetched and furthermore a situation where the processing of the branch instruction with the delay slot is possible is improbable, although the branch instruction with the delay slot is processed after being fetched, an influence on performance is alleviated. Furthermore, because either of the processing of the branch instruction with the delay slot and the fetching of the delay slot instruction is the instruction fetch, when concurrent progress is enabled, competition occurs, fetch order is reserved, or concurrent management before and after branch in the instruction queue is necessary. All of this makes logic complex and does not comparatively contribute to performance. Therefore, the method of awaiting the arrival of the delay slot instruction and performing the processing has noalmost no influence on branch performance and makes it possible to issue the instruction to the "slot undue-exception pattern."

Figure 15A:
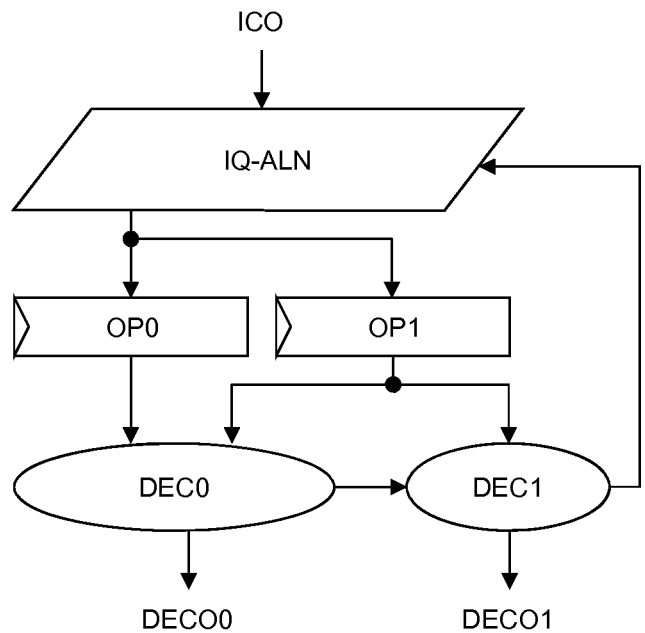
FIG. 15A is a block diagram illustrating a configuration of the decoder in which a maximum-32-bit instruction code according to a fourth embodiment is provided and two-instruction superscalar execution of 16-bit code and scalar execution of 32-bit code are enabled.
Figure 15B:
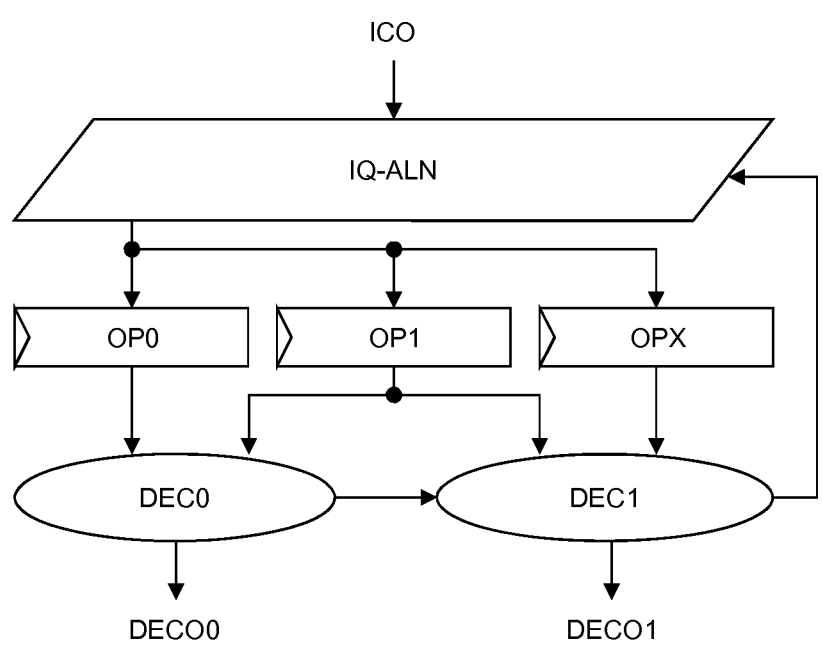
FIG. 15B is a block diagram illustrating a configuration of the decoder in which a maximum-48-bit instruction code according to the fourth embodiment is provided and a preceding instruction enables the two-instruction superscalar execution of 16-bit code and the scalar execution of 32-bit code.

FIG. 15A and FIG. 15B illustrate a configuration example of the instruction issuing unit according to the present embodiment. There is no particular difference with the instruction issuing unit of the normal 16/32-bit-mixed instruction set, and a function is added that regards an instruction that utilizes the newly-defined "slot undue-exception pattern" as a new 32-bit instruction and decodes the newly-defined "slot undue-exception pattern". In FIG. 15A, a maximum-32-bit instruction code is supplied, and two-instruction superscalar execution of the 16-bit code and scalar execution of the 32-bit code are possible. In FIG. 15B, a maximum-48-bit instruction code is supplied, and in a case of the preceding instruction, two-instruction superscalar execution of the 16-bit code and scalar execution of the 32-bit code are possible.

In an example in FIG. 15A, an instruction queue aligner IQ-ALN buffers an instruction cache output ICO, outputs the front 32-bit code, and latches the front 32-bit code to instruction code latches OP0 and OP1. The output of the instruction code latch OP0 is the preceding 16-bit code or the former-half 16-bit of the preceding 32-bit code, and the output of the instruction code latch OP1 is the following 16-bit code or the latter-half 16-bit of the following 32-bit code.

An instruction decoder DEC0 receives the outputs of the instruction code latches OP0 and OP1 as inputs, decodes the preceding 16-bit code or 32-bit code, and outputs a control signal DECO0 and an invalidation signal INV-DECO1 of the output of the instruction decoder DEC1. The invalidation is performed in a case where the instruction decoded by the instruction decoder DEC0 is the 32-bit code.

On the other hand, the instruction decoder DEC1 receives the output of the instruction code latch OP1 as an input and decodes the following 16-bit. In a case where the output of the instruction code latch OP1 is the former half of the 32-bit code, the instruction decoder DEC1 does not perform the decoding and controls an instruction queue aligner IQ-ALN in such a manner that the instruction queue aligner IQ-ALN is supplied, as the output of the instruction code latch OP0, to the instruction decoder DEC0 in the next cycle.

The instruction queue aligner IQ-ALN enables a 0-, 16-, or 32-bit pointer to proceed by the number of instructions that the instruction decoders DEC0 and DEC1 output after succeeding in the decoding and outputs the next instruction code.

In an example in FIG. 15B, the instruction queue aligner IQ-ALN buffers the instruction cache output ICO, outputs the front 48-bit code, and latches the front 48-bit code to instruction code latches OP0, OP1, and OPX. The output of the instruction code latch OP0 is the preceding 16-bit code or the former-half 16-bit of the preceding 32-bit code, the output of the instruction code latch OP1 is the following 16-bit code, the former-half 16-bit of the following 32-bit code, or the latter-half 16-bit of the preceding 32 bit code, and the output of the instruction code latch OPX is the latter-half 16-bit of the following 32-bit code.

The instruction decoder DEC0 is the same as the example in FIG. 15A. On the other hand, the instruction decoder DEC1 receives the outputs of the instruction code latches OP1 and OPX as inputs and decodes the following 16-bit or the following 32-bits.

The instruction queue aligner IQ-ALN enables a 0-, 16-, 32-bit, or 48-bit pointer to proceed by the number of instructions that the instruction decoders DEC0 and DEC1 output after succeeding in the decoding and outputs the next instruction code.

Figure 16:
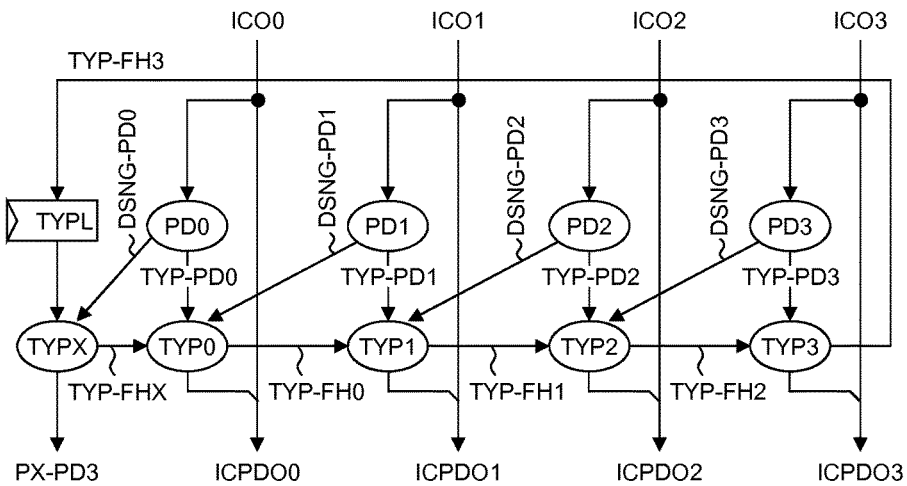
FIG. 16 is a block diagram illustrating a configuration that is at work when the instruction pre-decoder in FIG. 10 in the third embodiment is made to correspond to the embodiment in a case where the fourth embodiment in which the slot undue-exception patterns are all used in a new 32-bit instruction definition is integrated in the form similar to the method of the third embodiment.

FIG. 16 illustrates how the instruction pre-decoder that is as illustrated in FIG. 10 in the third embodiment is changed in the present fourth embodiment, in a case where the present embodiment in which the "slot undue-exception patterns" are all used in a new 32-bit instruction definition without imposing the limitation is integrated in the form similar to the method of the third embodiment.

First, the four instruction codes ICO0 to ICO3, fetched from the instruction cache IC in the instruction fetch unit IFU, are pre-decoded by the pre-decoders PD0 to PD3 of each instruction code, respectively. Then, among the normal six types of the instruction types TYPE in FIG. 4, it is determined whether or not each of the four instruction codes ICO0 to ICO3 is the instruction that cannot be placed in the delay slot, that is, the branch instruction BR, the branch instruction with the delay slot BRD, the load store instruction LSX that cannot be placed in the delay slot, or the prefix PX. Then, the delay slot disapproval signals DSNG-PD0 to DSNG-PD3 are output.

Furthermore, results TYP-PD0 to TYP-PD3 of determining the instruction type TYPE are output. According to the present embodiment, because it is necessary to add the type, the former-half 16-bit of the 32-bit code not illustrated in FIG. 4, a 32-bit arithmetic operation instruction former-half EXFH, a 32-bit load store instruction former-half LSFH, and a 32-bit branch instruction former-half BRFH are added, and the results TYP-PD0 to TYP-PD3 of determining the above-described instruction type TYPE are output.

The 32-bit arithmetic operation instruction former-half EXFH, the 32-bit load store instruction former-half LSFH, the 32-bit branch instruction former-half BRFH, the branch instruction with the delay slot BRD, and the rest ETC are defined as the instruction type former-haves TYP-FH0 to TYP-FH3 and TYPX. The latter half of a 32-bit code, an instruction that cannot be placed in the delay slot, and a single 16-bit code are present as the rest ETC.

First, the instruction type adjustment circuits TYP0 to TYP2 generate instruction type former-haves TYP-FH1 to TYP-FH3 that are transmitted to the instruction type adjustment circuits TYP1 to TYP3 of the following adjacent instruction codes and the instruction type that is added to instruction codes ICO0 to ICO2, from the results TYP-PD0 to TYP-PD2 of determining the above-described instruction type TYPE, the instruction type former-halves TYP-FH0 to TYP-FH1 and FHX from the instruction type adjustment circuits TYP0 to TYP1 and TYPX of the preceding adjacent instruction code and the delay slot disapproval signals DSNG-PD1 to DSNG-PD3.

If the outputs from the instruction type adjustment circuits TYP0 to TYP1 and TYPX of the preceding adjacent instruction code are the rest ETC and the results TYP-PD0 to TYP-PD2 of determining the instruction type TYPE are the 32-bit arithmetic operation instruction former-half EXFH, the 32-bit load store instruction former-half LSFH, the 32-bit branch instruction former-half BRFH, or the branch instruction with the delay slot BRD, the results TYP-PD0 to TYP-PD3 of determining the instruction type TYPE are used as are, and in other cases, the rest ETC is generated as the instruction type former-halves TYP-FH0 to TYP-FH2.

On the other hand, as the instruction type added to the instruction codes ICO0 to ICO2, if the instruction type former-halves TYP-FH0 to TYP-FH1 and FHX from the instruction type adjustment circuit of the preceding adjacent instruction code is the 32-bit arithmetic operation instruction former-half EXFH, an arithmetic operation instruction EX is output, if the instruction type former-halves TYP-FH0 to TYP-FH1 and FHX are the 32-bit load store instruction former-half LSFH, a load store instruction LS is output, if the instruction type former-halves TYP-FH0 to TYP-FH1 and FHX are the 32-bit branch instruction former-half BRFH, the branch instruction BR is output, if the instruction type former-halves TYP-FH0 to TYP-FH1 and FHX are the branch instruction with the delay slot BRD, the results TYP-PD0 to TYP-PD2 of determining the instruction type TYPE are output with TYP being converted into TYP-DS according to FIG. 4, and in the case of the rest ETC, the following is output. If the results TYP-PD0 to TYP-PD2 of determining the instruction type TYPE are the branch instruction with the delay slot BRD, and further if the delay slot disapproval signals DSNG-PD1 to DSNG-PD3 from the following adjacent instruction are asserted, because of the "slot undue-exception pattern," the prefix code PX is output, and further if the delay slot disapproval signals DSNG-PD1 to DSNG-PD3 from the following adjacent instruction are not asserted, the branch instruction BR is output. If the results TYP-PD0 to TYP-PD2 of determining the instruction type TYPE are the load store instruction LSX that cannot be placed in the delay slot, the load store instruction LS is output. In other cases, the results TYP-PD0 to TYP-PD2 of determining the instruction type TYPE are output as are.

On the other hand, the instruction type adjustment circuit TYP3 is different from the above-described instruction type adjustment circuits TYP0 to TYP2 in that the instruction type adjustment circuit TYP3 does not receive a signal equivalent to the delay slot disapproval signals DSNG-PD1 to DSNG-PD3 from the following adjacent instruction. Because of this, in a case where as the instruction type added to the instruction code ICO3, the instruction type former-half TYP-FH2 from the instruction type adjustment circuit of the preceding adjacent instruction code is the rest ETC and the results TYP-PD0 to TYP-PD2 of determining the instruction type TYPE are the branch instruction with the delay slot BRD, the branch instruction BR is always output. In other cases, the same operation as that of the above-described instruction type adjustment circuits TYP0 to TYP2 is performed.

Moreover, the latch TYPL latches and outputs the instruction type former-half TYP-FH3 that is output by the instruction type adjustment circuit TYP3, and the instruction type adjustment circuit TYPX receives this and first outputs the latch TYPL as the instruction type former-half TYP-FHX. Then, the above-described instruction type adjustment circuit TYP3 continuously performs the processing that it cannot perform because it does not receive the signal equivalent to the delay slot disapproval signals DSNG-PD1 to DSNG-PD3 from the following adjacent instruction. With regard to the output of the latch TYPL, if the delay slot disapproval signal DSNG-PD0 from the branch instruction with the delay slot BRD and the following adjacent instruction is asserted, the prefixing signal code PX-PD3 is asserted and, in other cases, is negated.

As described above, because the instruction type adjustment circuits TYP0 to TYP3 and TYPX are connected in serial, the processing is at a low speed, but the "slot undue-exception patterns" can be all used in the present embodiment, compared to the third embodiment. Moreover, generally, if the number of steps is optimized, in a serial N-step connection, the number of steps can be decreased up to the extent expressed in the formula: Log N.

The following effects according to the fourth embodiment can be obtained.

In a case where the "slot undue-exception pattern" is handled as the 32-bit instruction, by detecting the "slot undue-exception pattern" in the above-described method, the dispatching may be performed in the same as the 16/32-bit length-mixed instruction set method. In a case where the instruction set is already extended in the 16/32-bit length-mixed instruction set method and thus the sequential decoding of the instruction is necessary, this method is suitable. In this case, because there is no memory that limits the "slot undue-exception pattern" to the pattern that can be efficiently issued in a manner that enables superscalar instruction as above described, all the "slot undue-exception patterns" should be efficiently utilized. Therefore, according to this embodiment, in the processor into which the 16/32-bit length-mixed instruction set is integrated, the "slot undue-exception patterns," approximately 144.5 M patterns, can be used in defining a new 32-bit instruction definition without influencing branch performance.

(Fifth Embodiment)

The concept of the present invention can be applied not only to the pattern such as the "slot undue-exception pattern" that is utilized in each of the embodiments described above, but also to a combination of two instructions (a specific combination pattern) that has no meaning in terms of the program. For example, if in a case of successive loads to the same register, a register of a load destination of the first load is not a source operand of the second load, it is not necessary to execute the first load. Such successive loads to the same register are not prohibited, but if such a combination of two instructions is prohibited and the present invention is applied, the code space can be extended.

For example, as illustrated in FIG. 11, there are assumed to be five instructions each of which stores a result of executing the operand with the 12-bit instruction in the register. The pattern is created such that the result of combining the arbitrary two instructions and executing the combination is stored in the same register. At this time, an ADD instruction has a meaning in a case where the ADD instruction is the following instruction, and MOV.L@ (Rm, disp4) and Rn instructions have a meaning in a case where the MOV.L@ (Rm, disp4) and Rn instructions are the following instructions and in a case where the register in which the preceding instruction stores the result of the execution is Rm. When the two instructions are set as being dedicated to the preceding instructions in order to make it easy to detect the pattern, the 32-bit pattern can be created by using five instructions for the preceding instruction and using three instructions for the following instruction. As a result, there are $5 \times 2^{12} = 20$ k patterns for the preceding instruction and $3 \times 2^{12} = 12$ k patterns for the following instruction, and because the probability of the register numbers being consistent with each other is 1/16, the number of the 32-bit patterns available is 15 M. The time is increased for checking whether the registers in which the result of the execution is stored are the same, compared to the "slot undue-exception pattern," but the patterns that are newly obtained are many. The patterns that are obtained in this manner can be detected if sequentially decoded in the same manner as in the fourth embodiment.

On the other hand, five instructions may be divided into two instructions and three instructions in order to be matched with an implementation method in which the preceding instruction and the following instruction need to be different from each other as in the third embodiment. For example, the preceding instructions may be limited to the two instructions that are not used in the following, without changing the following three instructions. As a result of this, the number of patterns is 6 M.

Figure 17:
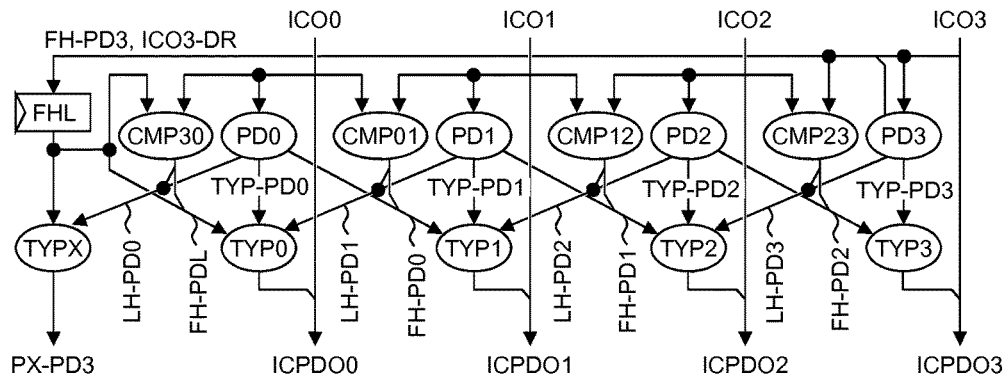
FIG. 17 is a block diagram illustrating an example in which, in a case where a fifth embodiment is integrated in the form similar to the method of the third embodiment, the instruction pre-decoder as illustrated in FIG. 10 in the third embodiment is configured for the fifth embodiment.

FIG. 17 illustrates an example in which in a case where the present embodiment is integrated in the form similar to the method of the third embodiment, the instruction pre-decoder as illustrated in FIG. 10 in the third embodiment is configured for the present embodiment.

According to the third embodiment, the "slot undue-exception pattern" is used, the former half is the branch instruction with the delay slot, and the latter half is the instruction that cannot be placed in the delay slot. However, according to the present embodiment, because the "combination of two instructions that has no a meaning in terms of the program" is used, corresponding to this, former-half portion candidate signals FH-PD0 to FH-PD3 and latter-half portion candidate signals LH-PD0 to LH-PD3 are used instead of the branch signals with the delay slot BRD-PD0 to BRD-PD3 and the delay slot disapproval signals DSNG-PD0 to DSNG-PD3. Furthermore, comparison circuits CMP01, CMP12, CMP23, and CMP30 detect whether the numbers of the result storage destination registers are consistent with each other between the adjacent codes. The result of the detection is added to the former-half portion candidate signals FH-PD0 to FH-PD3 and is transmitted from the preceding instruction code to the following instruction code, and the result of the detection is added to the latter-half portion candidate signals LH-PD0 to LH-PD3 and is transmitted from the following instruction code to the preceding instruction code. Then, the instruction type adjustment circuits TYP0 to TYP3 and TYX detect the combination of two instructions according to the present embodiments from these signals. If the combination of two instructions is the former-half portion, the instruction type adjustment circuits TYP0 to TYP3 and TYX add the instruction code type to the prefix PX. If the combination of two instructions is the latter-half portion, the instruction type adjustment circuits TYP0 to TYP3 and TYX convert the combination of two instructions into the type as the "combination of two instructions that has no a meaning in terms of the program" and adds the result of the conversion to the instruction codes ICO0 to ICO3.

Figure 18:
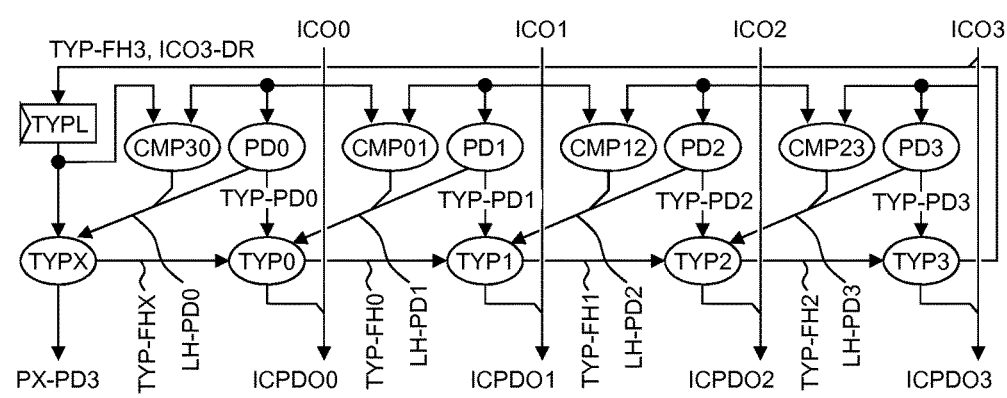
FIG. 18 is a block diagram illustrating an example in which, in the case where the fifth embodiment is integrated in the form similar to the method in FIG. 16 according to the fourth embodiment, the instruction pre-decoder as illustrated in FIG. 16 in the fourth embodiment is configured for the fifth embodiment.

FIG. 18 illustrates an example in which in a case where the present embodiment is integrated in the form similar to the method of the fourth embodiment in FIG. 16, the instruction pre-decoder as illustrated in FIG. 16 in the fourth embodiment is configured for the present embodiment.

As illustrated in FIG. 17, the latter-half portion candidate signals LH-PD0 to LH-PD3 are used instead of the delay slot disapproval signals DSNG-PD0 to DSNG-PD3, and the comparison circuits CMP01, CMP12, CMP23, and CMP30 detect whether the numbers of the result storage destination registers are consistent with each other between the adjacent codes, add the result of the detection to the latter-half portion candidate signals LH-PD0 to LH-PD3 to transmit the result of the detect being added to the latter-half portion candidate signals LH-PH0 to LH-PD3. Then, the instruction type adjustment circuits TYP0 to TYP3 and TYX generate the instruction type former-haves TYP-FH0 to TYP-FH3 and TYPX from these signals in the same manner as in the fourth embodiment and add the instruction code type to the instruction codes ICO0 to ICO3. Specifically, in a case where the combination of two instructions according to the present embodiment is detected, if the combination of two instructions is the former-half portion, the instruction code type is added to the prefix PX, and if the combination of two instructions is the latter-half portion, the combination of two instructions is converted into the type as the "combination of two instructions that has no a meaning in terms of the program" and is added to the instruction codes ICO0 to ICO3. A function of distributing instruction codes by the dispatch circuit EX-ISD, LS-ISD, and BR-ISD at this point may be as illustrated in FIG. 12.

Moreover, because a person of ordinary skill in the art can easily extend the present invention, for example, to a meaningless combination of three or more instructions, such as three successive loads to the same register, a detailed description of such an extension is omitted.

The following effects according to the fifth embodiment can be obtained.

The concept of the present invention can be applied not only to the pattern that generates an exception, such as the "slot undue-exception pattern," but also to a combination of multiple instructions, such as a combination of two instructions, which has no a meaning in terms of the program. For example, if in a case of successive loads to the same register, a register of a load destination of the first load is not a source operand of the second load, it is not necessary to execute the first load. Such successive loads to the same register are not prohibited, but if such a combination of two instructions is prohibited and the present invention is applied, the code space can be extended. Moreover, for example, the extension to the meaningless combination of three or more instructions, such as the three successive loads to the same register may be made. By doing this, in the processor into which the 16/32-bit length-mixed instruction set is already integrated, 15 M patterns resulting from the same integration as that of the fourth embodiment in which the codes are sequentially needed and 6 M patterns resulting from the integration as that of the third embodiment in which a parallel decoding is possible can be all used in defining a new 32-bit instruction, and this can contribute to performance or efficiency resulting from the instruction extension.

The invention contemplated by the inventor is specifically described above based on the embodiments, but the present invention is not limited to this and it goes without saying that various amendments can be made within a scope deviating from the gist of the present invention.

For example, a case is described in which among processors each with the 16-bit fixed-length instruction set or with the 16/32-bit length-mixed instruction set, the present invention is applied to the processor having the delay slot instruction, in which the undue exception of the slot is generated, but the present invention is not limited to this and can be applied to a 32-bit fixed-length instruction set or with a 32/64-bit length-mixed instruction set as well.

INDUSTRIAL APPLICABILITY

The present invention relates to a technology for adding a new instruction code with multiple times a basic length of an instruction code to an instruction set. For example, among processors, each with a 16-bit fixed-length instruction set or a 16/32-bit length-mixed instruction set, the present invention can be widely applied to a processor having a delay slot instruction, in which an undue exception of a slot is generated.

EXPLANATION OF REFERENCE NUMERALS

MPU DATA PROCESSOR
CPU PROCESSOR CORE
IBUS INTERNAL BUS
EIF EXTERNAL INTERFACE CIRCUIT
PER BUILT-IN PERIPHERAL MODULE
IC INSTRUCTION CACHE
IFU INSTRUCTION FETCH UNIT
PD PRE-DECODER
GIQ GLOBAL INSTRUCTION QUEUE
BRC BRANCH CONTROLLER
DC DECODER CACHE
LSU LOAD STORE UNIT
LSIQ LOAD STORE INSTRUCTION QUEUE
LSID LOAD STORE INSTRUCTION DECODER
LSE LOAD STORE INSTRUCTION EXECUTION UNIT
EXIQ EXECUTION INSTRUCTION QUEUE
EXID ARITHMETIC OPERATION INSTRUCTION DECODER
EXE ARITHMETIC OPERATION INSTRUCTION EXECUTION UNIT
BIU BUS INTERFACE UNIT
IC1, IC2 INSTRUCTION CACHE ACCESS
GIB GLOBAL INSTRUCTION BUFFER
EXPL ARITHMETIC OPERATION INSTRUCTION PIPELINE
EXIB LOCAL INSTRUCTION BUFFER
EXRR LOCAL REGISTER READ
EX ARITHMETIC OPERATION
WB REGISTER WRITE BACK
LSPL LOAD STORE INSTRUCTION PIPELINE
LSIB LOCAL INSTRUCTION BUFFER
LSRR LOCAL REGISTER READ
LSA ADDRESS COMPUTATION
DC1, DC2 DATA CACHE ACCESS
BRPL BRANCH INSTRUCTION PIPELINE
BR BRANCH
IFU INSTRUCTION FETCH UNIT
GIQ0 TO 15 INSTRUCTION QUEUE ENTRY FOR 16 INSTRUCTIONS
GIQP GLOBAL INSTRUCTION QUEUE POINTER
GIQP-DEC GLOBAL INSTRUCTION QUEUE POINTER DECODER
EXP ARITHMETIC OPERATION INSTRUCTION POINTER
LSP LOAD STORE INSTRUCTION POINTER
BRP BRANCH INSTRUCTION POINTER
EX-ISD ARITHMETIC OPERATION INSTRUCTION SEARCH DISPATCH CIRCUIT

LS-ISD LOAD STORE INSTRUCTION SEARCH DISPATCH CIRCUIT

BR-ISD BRANCH INSTRUCTION SEARCH DISPATCH CIRCUIT

IREQ-GEN INSTRUCTION FETCH REQUEST GENERATION UNIT

ICOV INSTRUCTION CACHE OUTPUT VALIDATION SIGNAL

GIQU0 TO 3 GLOBAL INSTRUCTION QUEUE UPDATE SIGNAL

GIQ0 TO 3, GIQ4 TO 7, GIQ8 TO 11, GIQ12 TO 15 GLOBAL INSTRUCTION QUEUE ENTRY GROUP

GIQO0 TO 15 GLOBAL INSTRUCTION QUEUE OUTPUT

BR-IV BRANCH INSTRUCTION CODE VALIDATION SIGNAL

BR-INST BRANCH INSTRUCTION

BR-PV BRANCH PREFIX CANDIDATE VALIDATION SIGNAL

BR-IV BRANCH INSTRUCTION CODE VALIDATION SIGNAL

What is claimed is:

1. A data processor configured to execute instructions defined in an instruction set, comprising:
a plurality of instruction pipelines;
a global instruction queue that sequentially accumulates and then output instruction codes that are fetched in parallel; and
a dispatch circuit that conducts a search with respect to the instruction codes that are output from the global instruction queue, for every instruction code type, and dispatches the instruction codes to the plurality of instruction pipelines based on a result of the search,
wherein an instruction in the instruction set which corresponds to a specific combination of instruction codes is difined as an additional instruction,
wherein the additional instruction differs from each original instruction corresponding to the instruction codes that form the specific combination,
wherein each of the original instructions corresponding to the instruction codes that form the specific combination are prohibited to be executed when the original instructions are combined,
wherein the instruction set comprises the additional instruction corresponding to the specific combination, the specific combination including a former-half instruction code and a latter-half instruction code,
wherein an instruction type of the additional instruction is the same as an instruction type of the latter-half instruction code,
wherein the former-half and the latter-half instruction codes are different from each other,
wherein the dispatch circuit conducts the search within a search scope encompassing the instruction codes that are output from the global instruction queue,
wherein in case that the dispatch circuit detects an instruction code within the search scope that matches an instruction code type for the search within the search scope, the dispatch circuit outputs the detected instruction code as being valid,
wherein when the detected instruction code is disposed at a location other than a beginning of the search scope, the dispatch circuit additionally outputs another instruction code that immediately precedes the detected instruction code as a prefix code candidate, and
wherein in case that the dispatch circuit does not detect an instruction code that matches an instruction code type for the search within the search scope, the dispatch circuit outputs an instruction code at an end of the search scope as a prefix code candidate.

2. The data processor according to claim 1,
wherein an instruction pipeline of the plurality of instructions pipelines to which the dispatch circuit outputs an instruction code as the prefix code candidate processes the additional instruction when the instruction code supplied as the prefix code candidate constitutes the specific combination, and disregards the instruction code supplied as the prefix code candidate when the instruction code supplied as the prefix code candidate does not constitute the specific combination.

3. The data processor according to claim 2,
wherein the instruction pipeline uses the instruction code that is disposed at the end of the search scope and is supplied as the prefix code candidate for constituting the specific combination with respect to an instruction code that is detected at a beginning of another search scope consecutive to the search scope of which the instruction code supplied as the prefix candidate is disposed at the end.

4. A data processor configured to execute instructions defined in an instruction set, comprising:
a plurality of instruction pipelines;
a global instruction queue that sequentially accumulates and then outputs instruction codes that are fetched in parallel; and
a dipatch circuit that conducts a search with respect to the instruction codes that are output from the global instruction queue, for every instruction code type, and dispatches the instruction codes to the plurality of instruction pipelines based on a result of the search,
wherein an instruction in the instruction set which corresponds to a specific combination of instruction codes is defined as an additional instruction,
wherein the additional instruction differs from each original instruction corresponding to the instruction codes that form the specific combination,
wherein each of the orignal instructions corresponding to the instruction codes that form the specific combination are prohibited to be executed when the original instructions are combined,
wherein the instruction set comprises the additional instruction corresponding to the specific combination, the specific combination including a former-half instruction code and a latter-half instruction code,
wherein an instruction type of the additional instruction is the same as an instruction type of the latter-half instruction code,
wherein the additional instruction is dedicated to a branch instruction,
wherein the branch instrcution includes a branch instruction with a delay slot,
wherein the former-half instruction code of the specific combination is the same as an instruction code of the branch instruction with the delay slot, and the latter-half instruction code of the specific combination is the same as an instruction code of another branch instruction that is not the branch instruction with the delay slot, wherein the another branch instruction is not allowed to be placed in the delay slot.

5. A data processor configured to execute instructions defined in an instruction set, comprising:
a plurality of instruction pipelines;

a glodal instruction queue that sequentially accumulates and then outputs instruction codes that are fetched in parallel; and a dispatch circuit that conducts a search with respect to the instruction codes that are output from the global instruction queue, for every instruction code type, and dispatches the instruction codes to the plurality of instruction pipeline based on a result of the search, wherein an instruction in the instruction set which corresponds to a specific combination of instruction codes is defined as an additional instruction, wherein the additional instruction differs from each original instruction corresponding to the instruction codes that form the specific combination, wherein each of the original instructions corresponding to the instruction codes that form the specific combination are prohibited to be executed when the original instructions are combined, wherein the instruction set comprises the additional instruction corresponding to the specific combination, the specific combination including a former-half instruction code and a latter-half instruction code, wherein an instruction type of the additional instruction is the same as an instruction type of the latter-half instruction code, wherein the additional instruction is dedicated to a branch instruction, and wherein the latter-half instruciton code of the specific combination is the same as an instruction code of the branch instruction, wherein a search scope encompasses a plurality of instruction codes that are output from the global instruction queue, wherein in case that the dispatch circuit detects an instruction code which matches an instruction code type at a location other than at an end of the search scope, the dispatch circuit outputs the instruction code detected as being valid, and the dispatch circuit additionally outputs another instruction code that immediately follows the instruction code as a postfix code candidate, wherein in case that the dispatch circuit detects an instruction code which matches an instruction code type at an end of the search scope, the dispatch circuit outputs the instruction code detected as being valid.

6. The data processor according to claim 5, wherein an instruction pipeline of the plurality of instructions pipelines to which the dispatch circuit outputs an instruction code as the postfix code candidate processes the additional instruction when the instruction code supplied as the postfix code candidate constitutes the specific combination, and disregards the instruction code supplied as the postfix code candidate when the instruction code supplied as the postfix code candidate does not constitute the specific combination.

7. The data processor according to claim 6, wherein the instruction pipeline uses an instruction code that is disposed at a beginning of another search scope, consecutive to the search scope, as a postfix code candidate for constituting the specific combination with an instruction code that is detected at an end of the search scope.

8. A data processor, comprising:

a plurality of instruction pipelines;

a global instruction queue that sequentially accumulates instruction codes that are fetched in parallel; and a dispatch circuit that conducts a search with respect to a plurality of instruction codes that are output from the global instruction queue, for every instruction code type, and dispatches the plurality of instruction codes to the plurality of instruction pipelines based on a result of the search, wherein the plurality of instruction pipelines are configured to process instructions corresponding to instruction codes supplied from the dispatch circuit, wherein an instruction pipeline of the plurality of instruction pipelines is configured to process additional instructions, each of the additional instructions corresponding to a respective specific combination of instruction codes, wherein each of the additional instructions is processed as a single instruction corresponding to a single instruction code that differs from each original instruction corresponding to the instruction codes composing the specific combination, wherein each of the original instructions is prohibited to be executed when a combination of instruction codes of the original instructions matches the corresponding specific combination, wherein each specific combination consists of a former-half instruction code and a latter-half instruction code, wherein each additional instruction has an instruction type that is the same as an instruction type of the latter-half instruction code, wherein each additional instruction is dedicated to a branch instruction, and an instruction code of the branch instruction is used in a latter-half instruction code of the corresponding specific combination, wherein the former-half instruction codes of the specific combinations are the same as instruction codes of branch instructions with delay slots, and the latter-half instruction codes of the specific combinations are the same as instruction codes of other branch instructions that are different from the branch instructions with the delay slots, wherein the other branch instructions are prohibited to be placed in the delay slots of the branch instructions.

* * * * *